United States Patent [19]

Petrofsky et al.

[11] Patent Number: 5,676,147
[45] Date of Patent: *Oct. 14, 1997

[54] ULTRASONIC RECEIVE BEAMFORMER WITH PHASED SUB-ARRAYS

[75] Inventors: Joseph G. Petrofsky, Sunnyvale; Samuel H. Maslak, Woodside; Christopher R. Cole, Cupertino, all of Calif.

[73] Assignee: Acuson Corporation, Mountain View, Calif.

[*] Notice: The term of this patent shall not extend beyond the expiration date of Pat. No. 5,573,001.

[21] Appl. No.: 698,976

[22] Filed: Aug. 16, 1996

Related U.S. Application Data

[62] Division of Ser. No. 524,993, Sep. 8, 1995, Pat. No. 5,573,001.

[51] Int. Cl.$^6$ ........................ A61B 8/00
[52] U.S. Cl. ........................ 128/661.01; 73/626
[58] Field of Search ................ 128/660.07, 660.08, 128/661.01; 73/625, 626; 367/7, 12, 103, 105

[56] References Cited

U.S. PATENT DOCUMENTS

| | | |
|---|---|---|
| 4,140,222 | 2/1979 | Maslak . |
| 4,475,169 | 10/1984 | Gilbert . |
| 4,476,538 | 10/1984 | Gilbert . |
| 4,549,152 | 10/1985 | Kumar . |
| 4,550,607 | 11/1985 | Maslak et al. . |
| 4,643,028 | 2/1987 | Kondo et al. . |
| 4,662,223 | 5/1987 | Riley et al. . |
| 4,679,176 | 7/1987 | Ogawa et al. . |
| 4,699,009 | 10/1987 | Maslak et al. . |
| 4,809,184 | 2/1989 | O'Donnell . |
| 4,829,491 | 5/1989 | Saugeon et al. . |
| 4,839,652 | 6/1989 | O'Donnell et al. . |
| 4,983,970 | 1/1991 | O'Donnell et al. . |
| 5,229,933 | 7/1993 | Larson, III . |
| 5,263,004 | 11/1993 | Larson, III . |
| 5,269,307 | 12/1993 | Fife et al. . |
| 5,345,426 | 9/1994 | Lipschutz . |
| 5,375,470 | 12/1994 | Matsushima et al. . |
| 5,477,859 | 12/1995 | Engeler . |
| 5,488,588 | 1/1996 | Engeler . |

OTHER PUBLICATIONS

Circuits, Signals, and Systems, William McC. Siebert, Chapter 17, Bandpass Operations and Analog Modulation Systems, 1986.

Filtering in the Time and Frequency Domains, Herman J. Blinchikoff & Anatol I. Zverev, Chapter Five, All–Pass Functions.

IEEE Journal of Solid–State Circuits, vol. SC–17, No. 6, Dec. 1982, A Monolithic Microsystem for Analong Synthesis of Trigonometric Functions and Their Inverses, 1982, pp. 1179–1191.

*Primary Examiner*—George Manuel
*Attorney, Agent, or Firm*—Brinks Hofer Gilson & Lione

[57] ABSTRACT

An ultrasonic receive beamformer includes transducers forming receive signals that are applied to sub-array processors. Each sub-array processor includes at least one phase shifter and a summer, and each phase shifter is responsive to at least one of the transducer signals to shift the transducer signal by a respective phase angle and to apply the phase shifted transducer signals to the summer. Each of the summers supplies a summed sub-array signal to a respective beamformer processor. The phase angles for any one of the sub-array processors form a sum substantially equal to zero. Furthermore, the phase angles for any one of the sub-array processors are independent of the time delay of the respective digital beamformer processor. The time resolution of the time delay of the digital beamformer processors is substantially as fine as the time resolution of the phase angles of the phase shifters. The phase angles of the phase shifters are updated at a slower rate than the focusing update rate of the beamformer processors. Quadrature filter network and heterodyning circuit implementations of the phase shifters are disclosed.

22 Claims, 10 Drawing Sheets

ULTRASONIC RECEIVE BEAMFORMER WITH PHASED SUB-ARRAYS

This application is a division of application Ser. No. 08/524,993, filed Sep. 8, 1995, now U.S. Pat. No. 5,573,001.

FIELD OF THE INVENTION

This invention generally relates to ultrasonic diagnostic systems, and specifically to receive beamformers, useful in such ultrasonic systems, for electronically forming a receive beam of ultrasonic energy through steering and focusing.

BACKGROUND OF THE INVENTION

Ultrasonic diagnostic systems are known to the art for providing real-time, cross-sectional (tomographic) images of the human body. Ultrasonic energy is focused at a target tissue by a transmit beamformer, and ultrasonic energy modulated by the target tissue is focused by a receive beamformer. In one class of modern ultrasonic diagnostic systems, the transmit and receive beamformers are both coupled to a single time-shared transducer array, and the receive beamformer focuses energy reflected by the target tissue. Alternately, the receive beamformer may be responsive to transmitted energy which has passed through the target tissue. The receive beamformer may provide images, color Doppler or spectral Doppler information regarding the target tissue, or combinations thereof. Typically, the transmit beamformer controls delays with which electrical signals are applied to individual transducers to achieve constructive interference of ultrasonic energy at the target tissue. Similarly, the receive beamformer applies carefully controlled delays to the transducer signals prior to summing to steer and focus the receive beam as desired.

Typically, a receive beamformer must provide both a large delay range and a high delay resolution. The delay resolution will set the focus accuracy of the system, and is much less than one cycle of the carrier frequency. Delay resolution accuracy of one 16th of a carrier cycle is good by current standards, but accuracy of one 64th of a cycle will afford improved image resolution. The delay range needed is set by the maximum path length difference between outer transducers in extreme cases of focusing or steering. This delay range can be as high as 45 carrier cycles (or more), for instance with a 128-element transducer array steered at 45° and having a transducer spacing of one half the carrier wavelength. The ratio of range to resolution accuracy can therefore be 1000:1 or even 2000:1. For straight-forward implementations, this corresponds to an analog delay line with 1000 or 2000 taps, or a digital RAM of that size. Furthermore, such a digital RAM must operate at high speeds; for a carrier cycle resolution of 1/32 with a carrier of 5 MHz, a 160 MHz operating speed would be needed, and even higher speeds would be needed either for a higher frequency carrier or for greater delay resolution.

To compound these difficulties, the delay profile (the relative delays of the different channels) must be dynamically changed during the receive interval if tracking focus is to be maintained at a point on the outwardly propagating transmit wavefront.

For these reasons, much effort has been directed at reducing the complexity of the receive hardware used to perform the delay for focusing and steering. Maslak, U.S. Pat. No. 4,140,022, recognized that the delay applied to each receive signal can be divided into a coarse delay and a fine delay, with the latter implemented as phase shifting. This division is based on the fact that there are two parts to the receive signal: the carrier and the envelope. The envelope contains information about the target along the range direction, and the envelope has much reduced delay resolution requirements as compared with the carrier. The carrier, specifically the relative phasing of the carrier across the channels, contains information about the location of the target in the azimuth direction. The carrier delay requires very fine resolution, but this can be achieved through phase rotation rather than delays. Maslak '022 uses heterodyning with a variable phase clock to achieve this phase rotation.

This division of the total delay into coarse and fine delays significantly simplifies the hardware required for receive beamforming. First, by phase shifting the signals on a per-channel basis (for fine delay), a greatly reduced number of taps are required on the analog delay lines (for coarse delay). Furthermore, adjacent channels can be summed after fine delay and before coarse delay, thereby reducing the number of delay lines required.

The basic approach set out in Maslak '022 (dividing the total delay into a coarse delay and a fine delay) has since been implemented in many forms.

Maslak, et al., U.S. Pat. No. 4,550,607, and Maslak, et al., U.S. Pat. No. 4,699,009, describe a simplified, cyclically symmetrical summing delay line architecture to further leverage the separation of coarse and fine delay, as well as a dynamic focusing method in which the settings of the delay lines for the coarse delay need not be changed during active receive. Dynamic focus is performed by adjusting the phase of the heterodyne reference signals for each channel. Again, after the per-channel application of fine delay, pairs of adjacent channels are summed prior to coarse delay.

Riley, et al., U.S. Pat. No. 4,662,223, increases to four the number of channels summed together after the per-channel application of a first delay, and prior to a second delay means. Riley '223 also notes that the output frequency of the mixers for the first delay could be at baseband as well as IF. Riley '223 teaches the use of analog delay lines for the second delay means, and in practical applications such analog delay lines are generally configured for coarse, not fine delays.

Saugeon, et al., U.S. Pat. No. 4,829,491, takes a more direct approach to the fine delay: each channel includes a predelay element which has only about one carrier cycle of total delay, but includes many taps for fine delay resolution. This predelay element is followed by a coarse delay structure. Four adjacent channels are summed after the individual application of fine delay, prior to the coarse delay means. Again, it is the fine delay means that are updated for dynamic focusing.

Saugeon '491 implements the coarse delay means with digital hardware, and notes that separation of total delay into fine and coarse delays allows lower clock frequencies. In a digital memory-based delay implementation, the clock period sets the delay resolution. Saugeon '491 also teaches a digital implementation of the fine delay using a variable-length shift register operating at a high clock frequency. The division into fine and coarse delays in this case limits the length of the high-frequency shift register, and the summation of four adjacent channels reduces the size, power, and cost of the coarse delay means.

Another early beamformer system implemented with digital delays is described in O'Donnell, et al., U.S. Pat. Nos. 4,809,184 and 4,839,652. O'Donnell '184 notes that delay resolution needed for accurate beamforming requires very high frequency operations for a simple RAM implementation—a much higher frequency than needed for Nyquist sampling (digitization) of the received signal. O'Donnell '184 addresses this problem by making fine adjustments to the sample clock for the analog-to-digital converter for each channel, and thereby allowing the use of coarse digital delays.

Larson, U.S. Pat. No. 5,263,004, teaches another method in which a surface-acoustic-wave (SAW) device is used as a fine delay element. The delay resolution of this technique is very good, but the SAW device limits the total delay range, so this device is followed by a coarse delay means.

Fife, et al., U.S. Pat. No. 5,269,307, describes an ultrasound imaging system in which fine delay phasing is performed using a vector modulator. A fine phase shift is created by splitting the received signal into two components with 90° phase separation by means of an all-pass-filter network. These two components are then multiplied with sinΦ and cosΦ weights to implement a phase shift Φ. This approach allows nearly continuous phase resolution when compared to earlier heterodyne techniques. Pairs of the outputs of these fine delay phase shifters are summed together prior to a coarse delay means, which can be implemented using delay lines or digital circuitry.

Matsushima, et al., U.S. Pat. No. 5,375,470, describes fine delay phase shifters that are implemented in a similar way, but at a different position in the signal processing path. Whereas Fife '307 teaches a 90° phase separation, followed by sinΦ or cosΦ weighting and summing of adjacent pairs, Matsushima '470 teaches as vector weighting followed by summing of adjacent pairs, and finally the 90° phase separation. By applying the sinΦ and cosΦ weighting before the 90° separation, the channels can be combined at an earlier stage to allow further reductions in hardware size, power, and cost. In both Matsushima '470 and Fife '307, the 90° phase shift is implemented with a delay line of one-quarter of the carrier frequency.

The system described by Matsushima '470 also includes dynamic focusing in which both the fine delay and the coarse delay are dynamically updated. Because changes to the coarse delay are, by nature, very large and would therefore tend to cause artifacts in the image, a large portion of the focusing apparatus is duplicated, and the two are time-interleaved with smoothed transitions between them. Advantageously, a common delay means is used, which includes both the coarse delays and the delays for the 90° shifts, with the coarse settings chosen by preceding switch matrixes. The settings for one switch matrix are updated when the other matrix is active to reduce image artifacts.

In systems having a fine/coarse separation of delay, the optimal coarse delay settings can be computed knowing only the target location and then rounding. However, a compromise must be made when paired channels require different optimal coarse delays. Furthermore, the coarse delays are generally not updated for dynamic focusing, or are updated at great hardware expense, as Matsushima '470 illustrates. Both the combined channel coarse setting compromise and a lack of coarse delay dynamic updates has limited the performance of prior art receive beamformers with fine/coarse delay separation.

Also, in all systems utilizing a fine/coarse separation of delay, the fine delay control must be generated knowing both the target location and the specifics of the coarse delay settings. Increased beamforming accuracy requires more frequent and more precise control of focusing and steering delays, making the generation of control signals a more significant task. Furthermore, the wide variety of transducer geometries and scan formats now proliferating also makes generation of the control signals a more significant task.

In the systems described above, the initial delay has been implemented using analog techniques, though often only digital timing signals (clocks) need to be involved (i.e Maslak '022 and O'Donnell '184).

With the advance of digital integrated circuit technology, the fine delay has, predictably, been implemented digitally. O'Donnell et al., U.S. Pat. No. 4,983,970, uses a CORDIC multiplier for phase rotation of a digitized ultrasound signal. A conventional digital memory (FIFO) is used for the coarse delay, with the phasing of the multiplier providing fine delay. In fact, the FIFO precedes the CORDIC multiplier, reversing the order of fine and coarse delays.

Lipschutz, U.S. Pat. No. 5,345,426, describes an alternative digital fine delay mechanism based on an FIR filter interpolator. In Lipschutz the coarse delay also precedes the fine delay.

Because it is possible to implement the fine and coarse delay in each of these digital systems in the same digital hardware, the difficulty of generating the control signals for the fine delay means is greatly eased.

For instance, in the digital beamformer described in co-pending U.S. patent application Ser. No. 08/432,615, assigned to the assignee of the present invention, there is coarse delay provided by a memory, fine delay provided by a complex demodulator for phase shift, and a control structure in which numerous delay adjustment terms are computed and combined using more precision than available in the coarse delay memory. The resulting least significant bits are rolled into the fine delay control.

FIG. 29 shows the architecture of these digital beamformers at a high level. Each receive signal is associated with a respective signal processing channel, and each channel includes an analog pre-conditioning circuit (APC), an analog to digital converter (ADC), and a digital beamformer processor (DBP). The outputs of the DBP's are summed in a summer.

The digital beamforming process can perform the summation en masse as shown, or incrementally (one channel at a time), but the process must include both very fine per channel delay adjustment and beamforming summation. Typically it also includes per-channel amplitude weighting (apodization) and demodulation to base-band. The fine delay adjustment is typically implemented as a phase rotation of an analytic baseband signal.

The analog pre-conditioning in this case can include signal compression (DGC/TGC), low-noise amplification, and other manipulations that are identically done to every channel.

The system of FIG. 29 requires an ADC and a DBP for every channel, and the result is a system of considerable size and cost, with high power requirements. This is so despite the fact that the signals received by adjacent channels may be largely the same, requiring similar firmware controls for the digital beamformer processors.

These last three examples are all-digital in that all the beamforming steps are performed digitally There are significant advantages to all-digital beamformers. The accuracy of the delay and phasing is exceptional, and unlike analog implementations, there will be little or no drift over the operating life of the machine. This accuracy improvement is particularly marked for dynamic receive focusing, where the local hardware can interpolate the controls to give nearly perfect focus for all output samples. It is also easier to include many advanced features with digital beamformers, such as adaptive phase aberration correction, multiple receive beamformation, system auto-calibration and the like.

However, the cost and power required per channel in a digital beamformer are substantial. Whereas the analog beamformer of Maslak '607 required only one ADC per beamformer, all-digital beamformers require one ADC per channel. Also, the delay and phasing digital hardware, though highly integrated, is expensive and requires substantial power.

Furthermore, improved imaging performance is possible with the use of two-dimensional transducer arrays, but at the expense of the concomitant need for more channels.

The present invention addresses the need for an ultrasonic beamformer with performance heretofore associated only with all-digital beamformers, but with reduced cost, power, and size.

SUMMARY OF THE INVENTION

According to this invention, an ultrasonic receive beamformer of the type comprising a plurality of digital beamformer processors and a plurality of transducers, each forming a respective receive signal, is provided with a plurality of sub-array processors. Each sub-array processor comprises at least one phase shifter and a summer, and each phase shifter is responsive to at least one of the receive signals to shift the receive signal by a respective phase angle and to apply the shifted receive signals to the summer. Each of the summers supplies a summed sub-array signal to a respective one of the beamformer processors.

According to a first aspect of this invention, the phase angles for any one of the sub-array processors form a sum substantially equal to zero. With this arrangement the digital beamformer processors can be used in the conventional manner, and each summed sub-array signal is therefore phased essentially the same as if it were from a virtual element located in the center of the respective sub-array.

According to a second aspect of this invention, each digital beamformer processor delays the respective sub-array signal by a respective time delay, and the phase angles for any one of the sub-array processors are independent of the time delay of the respective digital beamformer processor. Because the phase angles for the sub-array processors are independent of the time delay of the digital beamformer processors, control of the sub-array processors is substantially simplified.

According to a third aspect of this invention, each digital beamformer processor delays the respective sub-array signal by a respective time delay, and the time resolution of the time delays is substantially as fine as the time resolution of the phase angles. Because the time resolution of the time delays is substantially as fine as the time resolution of the phase angles, important simplifications and reductions in cost can be obtained, as described below.

According to a fourth aspect of this invention, the digital beamformer processors are characterized by a focusing update rate, and the phase angles of the phase shifters are updated at a slower rate than the focusing update rate. As explained below, in order to obtain a desired level of system precision, the update rate of the phase shifters can be substantially slower than the update rate of the focusing parameters of the digital beamformer processors. This can result in yet further simplifications and cost reductions.

As explained below, this invention can be implemented in many ways, including the use of phase shifters based on quadrature filter networks as well as phase shifters based on heterodyning circuits.

DETAILED DESCRIPTION OF THE PRESENTLY PREFERRED EMBODIMENTS

As discussed above, prior art analog beamformers have often combined adjacent channels at an early stage after fine delay adjustments to conserve on hardware cost, size, and power. This is advantageous when the analog delay lines used to set coarse resolution are the most expensive, power-hungry, and bulky components of a system.

However, as digital technology has progressed, the high cost, power, and size components of a beamformer are now the ADC's and the digital beamformer processors. Although cost is related to the coarse delay resolution, it is now nowhere near as strong a function of the delay resolution, and is often more a function of the number and variety of advanced features that are performed by the digital beamformer processors.

For this reason in the preferred embodiments discussed below two or more adjacent channels are summed prior to digitization, reducing the number of ADC's and digital beamformer processors (DBP's), but the division of focusing into coarse and fine is not done in terms of delay time.

Rather, the digital beamforming processing that follows the ADC retains its ability to perform fine delay resolution, and therefore the ability to smoothly update the delay time as needed for dynamic focusing. The channels in these summed groups are individually phased, but need not be delayed, prior to digitization.

This arrangement can be described as a division of the aperture. The groups of summed channels, called sub-arrays, perform a fine sampling of the aperture, and the phasing of individual receive signals steers each sub-array to the target of interest. The digital beamformer processors only receive inputs from the sub-arrays, which represent a coarse sampling of the aperture.

Two Channel Sub-Arrays

Figure 1:
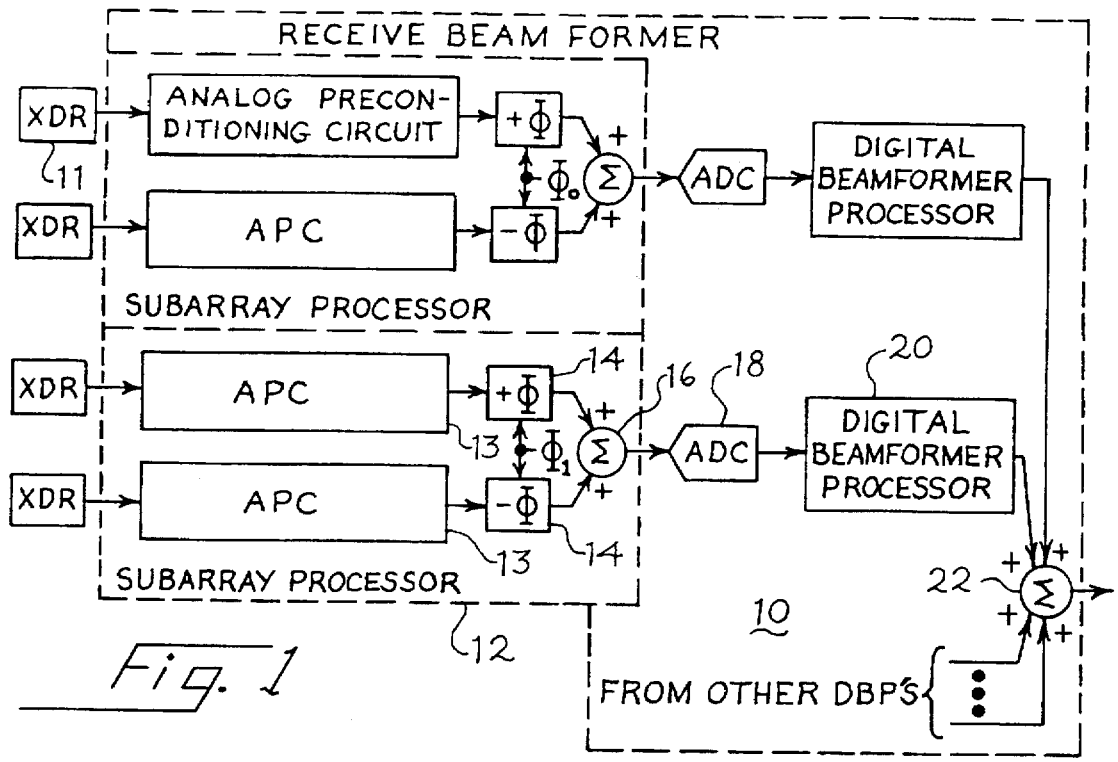
FIG. 1 is a block diagram of a receive beamformer that incorporates a first preferred embodiment of this invention.
Figure 29:
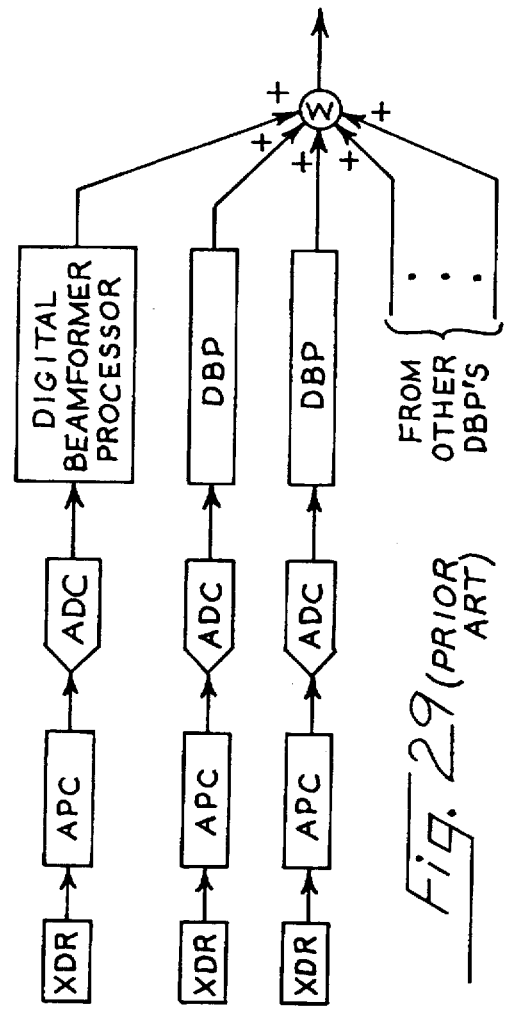
FIG. 29 is a block diagram of a prior art beamformer.

Turning now to the drawings, FIG. 1 shows a receive beamformer 10 which incorporates a first preferred embodiment of this invention. Individual ultrasonic transducers 11 generate receive signals that are applied to respective sub-array processors 12. These sub-array processors 12 include analog pre-conditioning circuits (APC's) 13, which may be of the type shown in FIG. 29. Preconditioned receive signals are then applied to respective phase shifters 14, which in this embodiment are grouped in pairs that apply equal and opposite phase shifts by the phase angle $\Phi$ to the respective pair of preconditioned receive signals.

The beamformer 10 includes by way of illustration one transducer per channel. Of course, one or more multiplexers (not shown) may be used to manage the aperture, and multiple transducers may be connected in parallel or summed to form the receive signal for a single channel. As used herein the term "channel" refers to a signal path that provides a unique combination of phase shift (in one of the sub-array processors 12) and focus (in one of the DBP's described below) for a signal.

The phase shifted receive signals within each pair are summed at a summer 16, and the summed signals are digitized in ADC's 18 and then applied to DBP's 20. The digital beamformer processors provide a very long delay range, as do prior art coarse delays, but they also provide very fine delay resolution, as well as the ability to smoothly update delay during dynamic focusing. The outputs of the DBP's 20 are then summed in a summer 22. The ADC's 18, DBP's 20, and summer 22 can be of the type described above in connection with FIG. 29, but the present invention is not limited to use with these components. Any suitable components can be used. As discussed below, the beamformer 10 provides many of the advantage of the digital beamformer of FIG. 29, while achieving a reduction in the number of ADC's 18 and DBP's 20 of 2:1.

As used herein the term "responsive to" is intended to be interpreted broadly. Thus, the phase shifters 14 are said to be responsive to the receive signals, even though the receive signals have been modified by the analog pre-conditioning circuits or summed with the receive signals of other transducers prior to application to the phase shifters. Furthermore, the digital beamformer processors can be said to be responsive to the receive signals, even though the receive signals have been modified by the sub-array processors prior to application to the digital beamformer processors.

As is well known in the field, the absolute delay, phase shift and gain of the channels in a receive beamformer are of little practical concern. For instance, a delay common to all channels simply postpones the arrival of the output data, and can easily be accounted for in the scan conversion process. Therefore, the average channel gain across the entire array, which can in general be a function of frequency, is herein referred to as "one" or "unity", and any other gain is simply relative to that. Likewise for phase, the average channel phase, in general a function of frequency, is herein referred to as "zero", and any other phase, such as those applied by phase shifters 14, is relative to that.

The beamformer 10 performs some of the beamforming for the sub-arrays in the analog domain, allowing pre-conditioned, phase shifted receive signals within a sub-array to be summed prior to the ADC's 18. In this embodiment, the sub-arrays are steered by means of phase shifts without delays, though phase shifters can utilize delays if desired. The fine delay elements of the above referenced Larson patent are an example of one suitable approach. The sub-arrays can include two, three, four, or more channels, but with even four channels, the performance degradation due to the use of phase alignment without true delays becomes significant.

Apodization can be applied on a per-sub-array basis with some loss in imaging performance. Alternatively, a per-channel apodization can be implemented in analog before the summer 16. Since apodization is relatively easy to implement, this is a straight-forward complexity vs. performance tradeoff.

The phase shifters 14 of each sub-array are driven with a respective phase control signal, $\Phi_i$, which is applied differentially to the channel pair of the sub-array, and which can be of either polarity. FIG. 1 shows the signals $\Phi_0$ and $\Phi_1$, which correspond to $\Phi_i$ for the first two sub-arrays of the receive beamformer 10. The phase shifters 14 can be implemented in many ways, including the phase shift networks and the heterodyning systems described below.

The goal of reduced hardware size, power, and cost will not be realized if the sub-array phasing adds excessive complexity. Fortunately, sub-array phasing has a number of advantages. Since the sub-array consists of adjacent transducer elements, the requisite delay difference within a sub-array is small, and the first simplification is that only phasing is applied and not delay.

In the system of FIG. 1, the range of $\Phi_i$ can be limited considerably, for example to +/−90° or +/−100°, with little or no impact on beamforming performance. Furthermore, the sign of $\Phi_i$ needed for a given scan line can be limited, to either positive or negative on a sub-array basis, also with little or no effect on performance. These limits on the range and sign of $\Phi_i$ can be exploited to reduce the hardware cost, power, size, and complexity of each sub-array. The system accuracy requirement translates to a coarser tolerance within the reduced range of the phase shifter. As an example, a system level accuracy of +/−5° is one part in 36 (2.8%) when compared to the full 360° of rotation possible, but is only one part in 9 (11.1%) when compared to the rotation of a phase shifter whose range is restricted to 90°.

Also, the rate of updates to $\Phi_i$ can be considerably slower than the phase and delay update rate in the DBP's 20, as explained in detail below. Furthermore, $\Phi_i$ and $\Phi_{i+1}$ required in adjacent sub-arrays are not drastically different, so linear interpolation can be used to determine $\Phi_i$, again to conserve on hardware cost, power, and size, with only a minor impact on system performance.

The phase shifters 14 provide differential focusing because the average phase adjustment applied to each sub-array is zero, i.e., the phase angles $+\Phi_i$ and $-\Phi_i$ form a sum substantially equal to zero. The analog input to each ADC 18 is therefore phased essentially the same as if it were from a virtual element located in the center of the respective sub-array.

One important advantage of differential focusing is that sub-array steering can be largely separated from the focusing of the DBP's 20. Certainly, the two should be directed at the same target for optimum performance, and so focussed in a dynamic manner. However (as an example of the independence of sub-array steering and DBP focusing), multiple, closely-spaced, time interleaved beams can be formed by the DBP's without any change to the control of the phase shifters 14. Furthermore, the focus controls for the DBP's are not substantially different than they would be for a DBP responsive to single transducer element located in the center of each of the sub-array element locations.

The differential nature of the sub-array focusing allows each sub-array to be controlled with only one control parameter, $\Phi_i$. For the preferred implementations of the phase shifters 14, there is physically only one control line, though multiple control lines can be used in alternate implementations, such as conventional heterodyning.

Differential focusing can also simplify sub-array apodization control: the update rate is slow, and the differences in weightings between channels within a sub-array are small. Furthermore, an analog implementation of apodization can be of sufficient accuracy to perform the entire apodization function, relieving the digital domain processing of this task. Such an implementation can be more flexible for scan format apodization development. Refinements to apodization are generally more common than refinements in phase and delay focusing controls, which are usually fixed by geometries and the speed of sound alone.

Focusing and Steering Control Signals

The receive beamformer 10 of FIG. 1 utilizes separate focusing and steering controls for the DBP's 20 and the phase shifters 14. The following sections define one approach to determining these controls.

Digital Beamformer Processor Control

Figure 30:
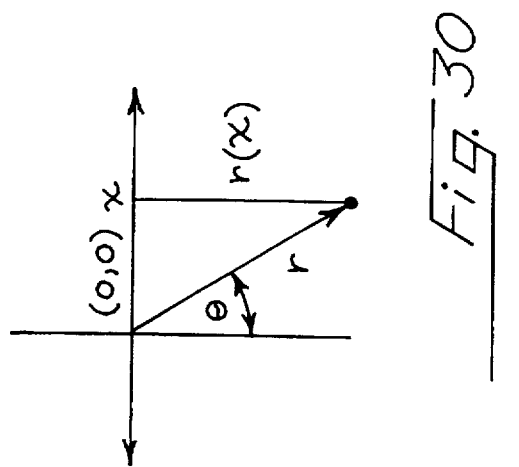
FIG. 30 is a schematic diagram showing geometric relationships relevant to beamformer focusing and steering delays.

Focusing of an ultrasound beamformer is based on the time delay differences, resulting from the path delay differences, for propagation of a returning pulse to the various transducer elements from a target location. If the problem is defined as shown in FIG. 30, a linear transducer array lies along the X-axis, a path length of r(x) exists from a target at range r, and the steering angle is θ. As shown, the ultrasound line origin is at (0,0), but the problem is merely offset for other line origin locations.

The path length r(x) is known from the law of cosines to be:

$$r^2(x) = r^2 + x^2 - 2rx\cos(90° - \theta); \quad \text{Eq. (1)}$$
$$= r^2 - 2rx\sin\theta + x^2.$$

Solving Eq. (1) for r(x) we get:

$$r(x) = r[1 - (2x/r)\sin\theta + x^2/r^2]^{1/2}. \quad \text{Eq. (2)}$$

Eq. (2) can be simplified by applying the Taylor approximation as follows:

Eq. (3)

$$r(x) = r(1 + [-(2x/r)\sin\theta + x^2/r^2]/2 - [-(2x/r)\sin\theta + x^2/r^2]^2/8 \ldots);$$
$$= r(1 - x\sin\theta/r + x^2/2r^2 - x^2\sin^2\theta/2r^2 + x^3\sin\theta/2r^3 - x^4/8r^4 \ldots);$$
$$= r(1 - x\sin\theta/r + x^2\cos^2\theta/2r^2 + x^3\sin\theta/2r^3 - x^4/8r^4 \ldots).$$

In many situations, the higher order terms of this expression for r(x) can be dropped. These higher order terms include powers of x/r, which itself is limited to ½ even with an F-number of 1.0, a lower limit even in advanced ultrasound beamformers. This allows the following simplification, which may not be accurate enough for all imaging situations, but which is suitable for the present discussion:

$$r(x) \cong r(1 - x\sin\theta/r + x^2\cos^2\theta/2r^2); \quad \text{Eq. (4)}$$
$$= r - x\sin\theta + x^2\cos^2\theta/2r.$$

The delay time τ required to focus the array at (r,θ), assuming a constant speed of sound c, is given by:

$$c\tau = r - r + x\sin\theta - x^2\cos^2\theta/2r;$$
$$\tau = x\sin\theta/c - x^2\cos^2\theta/2cr. \quad \text{Eq. (5)}$$

It should be recognized that τ is a function of x, r, and θ. It is also a function of time because r is a function of receive time, r=ct/2. Note that τ has a steering term which is independent of range and linear with x, and a focusing term which is inversely related to range and quadratically related to x. Eq. (5) can be used to steer and focus the DBP's using r, θ, and the center of the respective sub-array to determine x.

Differential Sub-array Processor Control

The differential focusing of the sub-array processors 12 of FIG. 1 uses a Φ term which is defined as follows:

$$\Phi = (x - x_c)\frac{\partial \tau}{\partial x} \cdot 2\pi f. \quad \text{(Eq. 6)}$$

In Eq. (6) $(x - x_c)$ is the distance of the respective transducer from the center of the sub-array and $\partial\tau/\partial x$ is the partial derivative at the center of the sub-array of the ideal time-delay per channel τ vs. x:

$$\partial\tau/\partial x = \sin\theta/c - x\cos^2\theta/cr. \quad \text{Eq. (7)}$$

The frequency f can either be fixed at the nominal center frequency of the carrier or be varied to track frequency downshift of the carrier as a function of depth.

A pair of transducers, with element spacing S, will both be located a distance S/2 from the center of their sub-array, so Eq. (6) can be expanded as follows:

$$\Phi = \frac{S}{2} \frac{\partial \tau}{\partial x} \cdot 2\pi f$$
$$= \frac{\pi S f}{c}\left(\sin\theta - \frac{x\cos^2\theta}{r}\right).$$

As will be shown, a sub-array can consist of more than two channels. The outermost elements will set the Φ requirement, and are located at a distance S(N−1)/2 from the center, where N is the number of channels in the sub-array, leading to a general result of:

$$\Phi = \frac{S(N-1)}{2} \frac{\partial \tau}{\partial x} \cdot 2\pi f$$
$$= \frac{\pi S(N-1)f}{c}\left(\sin\theta - \frac{x\cos^2\theta}{r}\right).$$

The two terms of $\partial\tau/\partial x$ can be considered as steering and focusing terms, where the steering term is independent of range and the focusing term is inversely related to range. Thus, a focusing control method for both the digital beam-forming time delay τ and the sub-array phase angle Φ can be used in which a 1/r term is computed and then scaled differently for the two focusing controls. The 1/r term is common across the array, but can be computed locally if desired. In this control method, only the four scaling constants f, x, θ, r for a line are distributed to control each sub-array processor, a dramatic reduction in control data rates.

Also note that the steering term is now constant with respect to x, and the focusing term is linear with respect to x., This allows a high degree of accuracy when the sub-array phasing term is not computed for each sub-array, but rather computed only at a few sub-arrays, and then linearly interpolated for other sub-arrays to reduce hardware complexity.

It is important to note that $\Phi$ is independent of $\tau$, and the sub-array processor 12 can be controlled without knowledge of $\tau$. This is a result of the fact that the time resolution of $\tau$ is substantially as fine as the time resolution of $\Phi$, and the total delay has not been divided into coarse delay and fine delay, as in the prior art discussed above. Control of the sub-array processor 12 is, therefore, substantially simplified.

Dynamic Focusing

The delay time $\tau$ is itself a function of time, and the delay time should be updated sufficiently often to maintain accurate focus. The same is true for the sub-array phase angle $\Phi$. To quantify the relationship between the desired update rates for the control signals for the DBP's and the sub-array processors, this section considers the partial derivatives of $\tau$ and $\Phi$ with respect to time. This relationship for $\tau$ is as follows:

$$\partial \tau / \partial t = (\partial \tau / \partial r)(dr/dt); \qquad \text{Eq. (8)}$$
$$= (x^2 \cos^2\theta / 2cr^2)(c/2);$$
$$= x^2 \cos^2\theta / 4r^2$$

$\partial \tau / \partial x$ is a unit-less parameter, representing μsec per μsec. It is typically much less than unity, representing a phase shift of less than 360° per carrier cycle.

The partial derivative of the sub-array phasing term $\Phi$ is:

$$\frac{\partial \Phi}{\partial t} = \left(\frac{\partial \Phi}{\partial r}\right)\left(\frac{dr}{dt}\right) \qquad \text{Eq. (9)}$$
$$= \frac{\pi S(N-1)f}{c} \left(\frac{x \cos^2\theta}{r^2}\right)\left(\frac{c}{2}\right)$$
$$= \frac{\pi S(N-1)f \times \cos^2\theta}{2r^2}.$$

Eq. (9) has units of radians per second, and a direct comparison can be made between Eq. (8) and Eq. (9) if Eq. (9) is divided by $2\pi f$:

$$\frac{1}{2\pi f} \frac{\partial \Phi}{\partial \tau} = S(N-1)x \cos^2\theta / 4r^2. \qquad \text{Eq. (10)}$$

Finally, the dynamic focusing update rates for the DBP's can be compared to the dynamic focusing update rates for the sub-array phase shifters by taking the ratio of the two error functions of Eq. (10) and Eq. (8).

$$\left[\frac{1}{2\pi f} \frac{\partial \Phi}{\partial \tau}\right]/[\partial \tau / \partial t] = [S(N-1)x \cos^2\theta / 4r^2]/[x^2 \cos^2\theta / 4r^2]; \qquad \text{Eq. (11)}$$
$$= S(N-1)/x.$$

Eq. (11) shows the reduced update rates required for the sub-array phasing term $\Phi$. For the same delay errors, the update rate for the sub-array phasing term $\Phi$ is reduced by a factor of S(N–1)/x relative to the update rate for the DBP's. For a 64 channel system, where x is a maximum of 32S, this represents a factor of 32 with two channels per sub-array, a factor of 16 with three channels per sub-array, and a factor of 10.67 with four channels per sub-array. This reduction is significant, allowing a commensurate reduction in hardware cost and power.

Curved Linear Transducer Arrays

The case of a curved linear transducer array is much more involved algebraically. However, if the analysis is restricted to a line with an origin at (0,0), which is reasonable because the update rate requirements do not change with line origin, the delay time can be found to be:

$$\tau = (1/c)\{r - [r^2 - 2xr\sin\theta + x^2(1 + (r/R_{xdcr})\cos\theta)]^{1/2}\}, \qquad \text{Eq. (12)}$$

where $R_{xdcr}$ is the radius of the curved array. For large values of $R_{xdcr}$, Eq. (12) degenerates to the linear case. A similar analysis to that above can be carried out on Eq. (12) with a very similar result: the sub-array phasing can be updated much more slowly than the digital beamformer time delays for errors of the same magnitude.

Processing Capabilities

The receive beamformer 10 allows many advanced capabilities previously associated only with all-digital beamformers of the type having one ADC per channel. For instance, the ability to form multiple, time interleaved, receive beams is described in U.S. patent application Ser. No. 08/432,615, assigned to the assignee of the present invention. The receive beamformer 10 allows at least two different forms of multi-beam operation. Closely spaced beams, where there are multiple receive beams in close proximity, are possible with the beamformer 10. Widely spaced beams are not practical if any sub-array is required to point at multiple beams at the same time. However, split-aperture multi-beam techniques, in which the aperture is split into independent sub-apertures, each forming a respective beam, can be implemented with the beamformer 10 with the only restriction being that the aperture splits should not sub-divide a sub-array.

The beamformer 10 can also provide adaptive focusing for phase aberration correction. Such schemes generally work on blocks of channels, and the only restriction this architecture adds is that the blocks should be formed of an integer number of sub-arrays.

A third capability possible with this architecture is the ability to perform amplitude and phase calibration. Such calibration is commonly done to correct for channel-to-channel variations in the analog circuitry, which lacks the inherent repeatability of digital processing. Calibration by the DBP's is performed on a sub-array basis, but if all of the analog processing within each sub-array has the same, or highly correlated, error sources, then sub-array calibration can correct for most or all of the errors.

One way to keep the errors highly correlated within the channels of the sub-arrays is to perform all the analog processing for a given sub-array on one integrated circuit. This may be impractical to implement, especially with more than two channels per sub-array. For a multiple component implementation, a partitioning that has all channels of the sub-array for each function in the signal path all within the same circuit will also have highly correlated error sources across the channels. An alternate partitioning having all the functions for each channel in repeated, like, components would appear to be desirable from a manufacturing standpoint, as more of the same components are needed, but this would not lend itself as well to calibration on a sub-array basis.

Phase Shift Network Implementations of Phase Shifters

The presently preferred implementation of the phase shifters 14 utilizes phase shift networks. These networks use a pair of either all-pass or low-pass filters that, over the frequency range of interest (1–14 MHz for example), provide the same amplitude and phase shifts that are 90° apart. There is a well-established art to the design of such networks which grew out of early SSB communications dating back to the 1950's. See e.g. W. M. Siebert, *Circuits, Signals And Systems* (Cambridge, Mass., MIT Press, 1986) pp. 507–557 and H. J. Blinchikoff and A. I. Zverev, *Filtering In The Time And Frequency Domains* (Malabar, Fla., Krieger, 1976) pp. 212–247. For a given filter order and frequency range, pole-zero placements can be computed; more filter elements and smaller frequency ranges achieve arbitrarily better compliance to the design goal of 90° phase difference.

The filters need not be linear in phase, and the main objective is that their phase be 90° apart across the frequency range of interest. In general, such filters are non-linear in phase, introducing time-domain dispersion that may be detrimental to imaging performance. However, the dispersion over the frequency range of interest is the same for both filters, and the dispersion can be corrected once, at the summed output of the beamformer.

Figure 2:
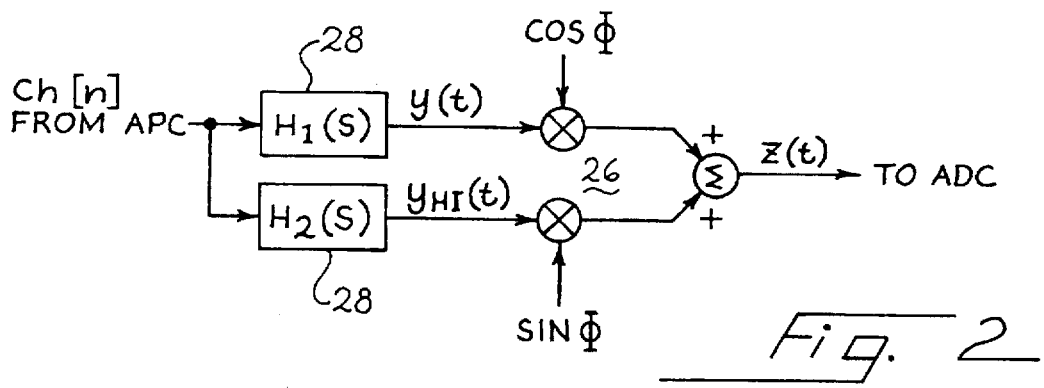
FIGS. 2 through 9 are block diagrams of six different phase shifters, all suitable for use in the embodiment of FIG. 1.

FIG. 2 shows one suitable phase shift network 26. The network includes two quadrature filters 28 labeled $H_1(s)$ and $H_2(s)$. The output of the second filter is the Hilbert transform of the output of the first filter, as noted in FIG. 2. Thus, when the phase of an input sinusoid is such that $y(t)=\cos(\omega t)$, then $y_{H}(t)=\sin(\omega t)$. The configuration of the network exploits the angle difference formula from trigonometry:

$\cos(a-b)=\cos(a)*\cos(b)+\sin(a)*\sin(b)$.

In the case of FIG. 2, the output signal $Z(t)$ is given by the following equation:

$$\begin{aligned} Z(t) &= y(t)*\cos(\Phi)+y_{H}(t)*\sin(\Phi); \\ &= \cos(\omega t)*\cos(\Phi)+\sin(\omega t)*\sin(\Phi); \\ &= \cos(\omega t - \Phi). \end{aligned}$$

Thus, the network 26 implements a phase shift of $\Phi$ to the input based on the control signals $\cos\Phi$ and $\sin\Phi$. Generation of these control signals is discussed below.

Figure 3:
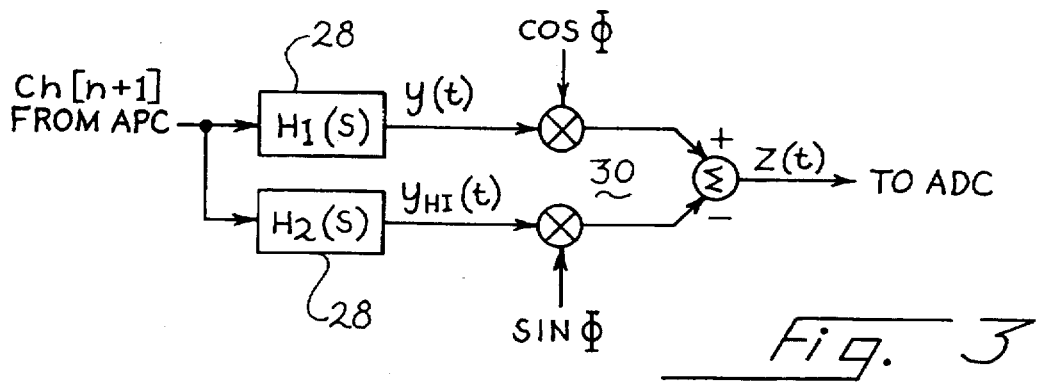

To implement the phase shift network 30 for the adjacent channel in a sub-array of two channels, the polarity of one of the terms is merely inverted, as shown in FIG. 3. The inversion can also be implemented in the control path by using $-\sin\Phi$ rather than $\sin\Phi$ as the input to the multiplier 32. In either case, the output is then given by the following equation:

$$\begin{aligned} Z(t) &= y(t)*\cos(\Phi)-y_{H}(t)*\sin(\Phi); \\ &= \cos(\omega t)*\cos(\Phi)-\sin(\omega t)*\sin(\Phi); \\ &= \cos(\omega t + \Phi) \end{aligned}$$

Because of the 90° separation between the filters 28, the networks 26, 30 operate as a quadrature filter phase shifter which applies a differential phase shift to the respective receive signals. The network 26 imparts this phase shift $\Phi$ to signals over a very broad band of center frequencies; the useful frequency range is set by the $H_1(s)/H_2(s)$ network design, which can be arbitrarily wideband. This is important in a system where multiple-frequency transducer arrays can be used, and where the received center frequency will gradually down-shift during the course of a scan beam. This is in contrast to the phase shift networks taught in Fife '307 and Matsushima '470 where in the 90° split is obtained with delay lines, which are switched to different, discrete, delay settings to work with alternate center frequencies.

Figure 4:
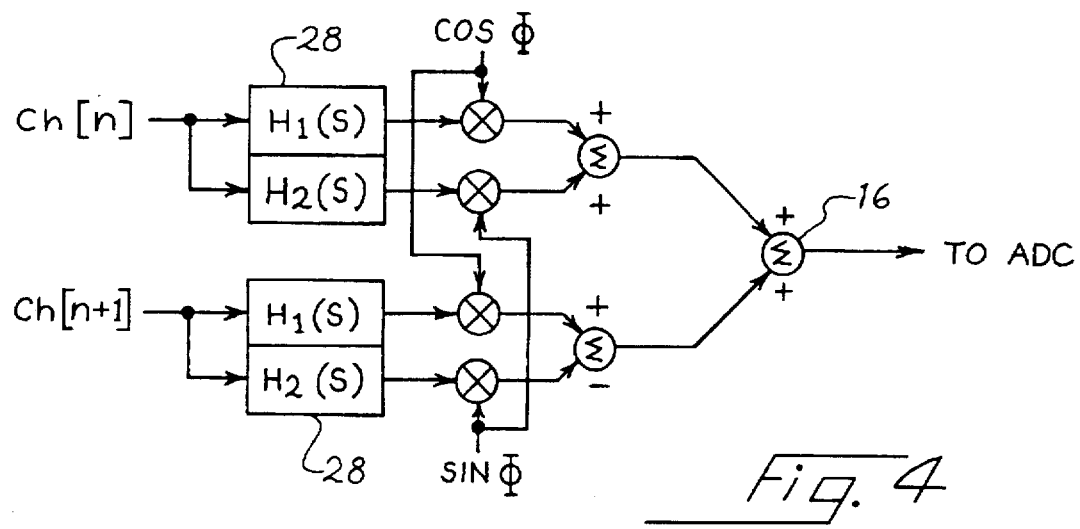
Figure 5:
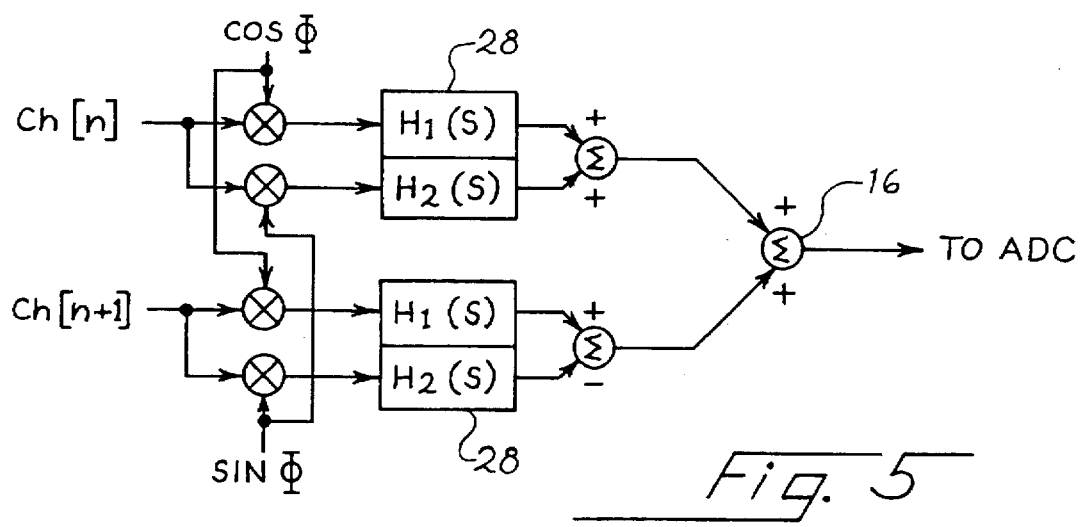
Figure 6:
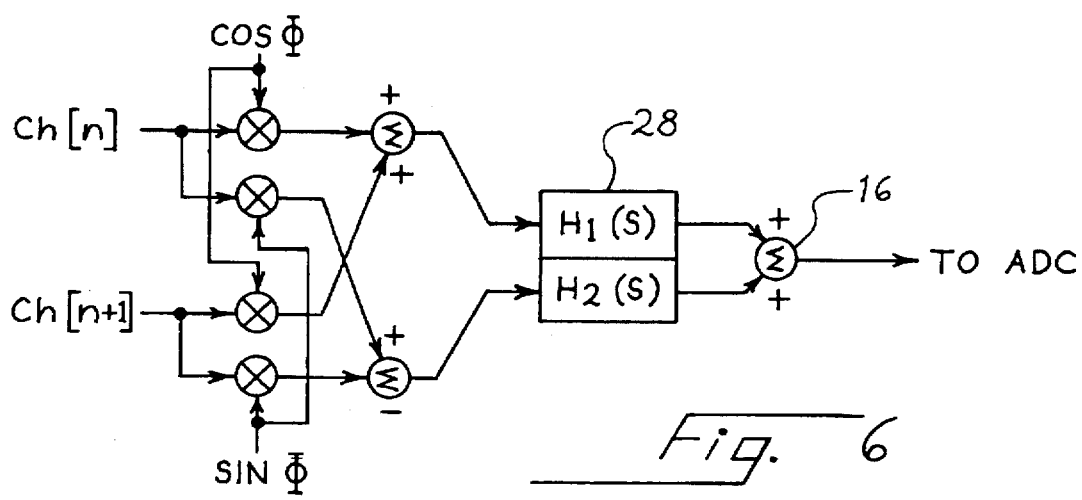

The phase shifters and summer of FIG. 1 can be implemented as shown in FIG. 4 for a single two-channel sub-array. Because the phase shift control signal $\Phi$ is much lower bandwidth than the ultrasound signals, the $\cos\Phi$ and $\sin\Phi$ multiplications can be considered linear, time-invariant scalings, and as such can be implemented ahead of the filters. This results in an implementation as shown in FIG. 5. The summing operations are also linear and time-invariant, and can be rearranged with the filters, as shown in FIG. 6.

Figure 7:
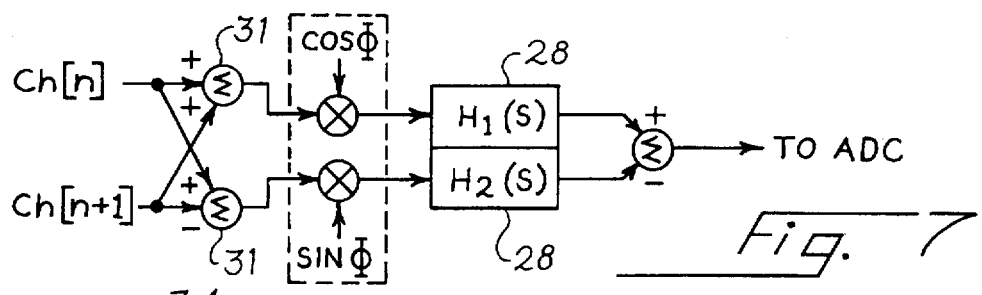

FIG. 7 shows another re-arrangement of elements, in which the channels are summed prior to multiplications or filtering. The phase shifter of FIG. 7 includes two summers 31 which receive the same receive signals as inputs. The upper summer 31 sums the receive signals with like polarities to form an additive sum, and the lower summer 31 sums the receive signals with opposed polarities to form a differential sum. The summers 31 generate respective first output signals, which are multiplied by respective phase control signals $\cos\Phi$, $\sin\Phi$ to generate respective second output signals. These second output signals are then filtered in quadrature filters 28, which may be identical to the filters 28 of FIG. 2 discussed above. Finally, the outputs of the filters 28 are summed to form the sub-array processor output signal that is applied to the respective ADC. In the circuit of FIG. 7, a single phase shifter responds to two receive signals to perform the desired phase shifts as described above.

The phase shifters of FIG. 7 are presently preferred over those of FIGS. 2–6, because the FIG. 7 phase shifters reduce the number of filters and other components needed. This is a significant advantage for an integrated solution, there the energy storage components of the filters can be larger than the remainder of the circuitry.

As noted earlier, an absolute phase shift across all the channels of the beamformer 10 gives equivalent performance, so the average phase shift imparted by the phase shifters 14 can be changed to any arbitrary amount. For instance, in FIGS. 2–7, the average phase shift is that of the $H1(s)$ network. If $\Phi$ is replaced by $\Phi+/-90°$, the average phase shift is that of the $H2(s)$ network, and the control scheme needn't be significantly changed.

Figure 8:
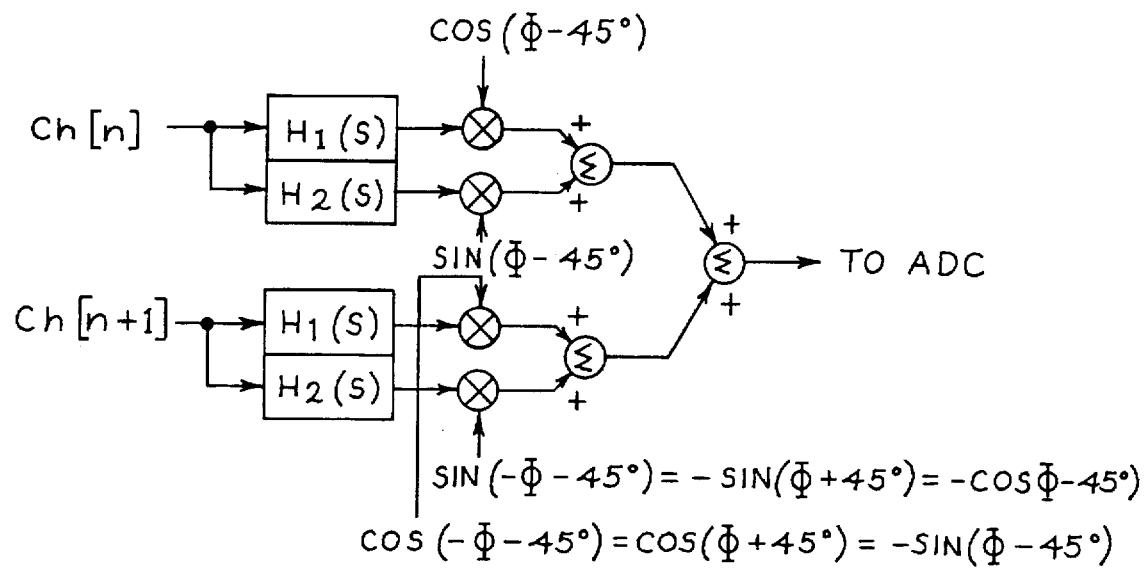
Figure 9:
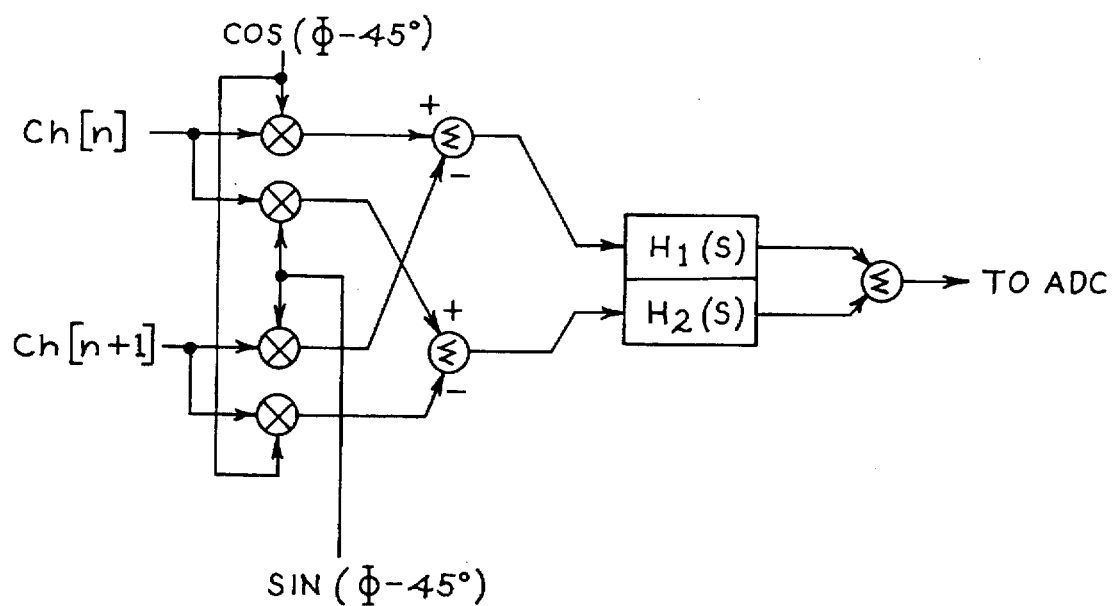

In fact, an arbitrary phase shift can be added in which each cos/sin argument is decreased by $\psi$. In general, this will increase the number of control parameters needed to the multiplier because $\cos(\Phi-\psi)$, $\sin(\Phi-\psi)$, $\cos(-\Phi-\psi)$, and $\sin(-\Phi-\psi)$ are not easily related for most values of $\psi$. The exception to this is when $\psi$ is equal to a multiple of 45°. For instance, FIG. 8 shows a sub-array phase shifter of the type shown in FIG. 4 modified to have a common phase shift of 45° and a differential phase shift of $+/-\Phi$. As can be seen, there are only two multiplier constants. This allows some simplification. FIG. 9 is analogous to FIG. 6. The simplification cannot be carried any further in this case because the multiplication products going to the initial summers have different control terms.

In FIG. 9, the average phase shift is half-way between that of $H1(s)$ and $H2(s)$. This may have advantages in terms of reduced sensitivity to errors in the filters or in terms of dynamic range. Many such variations in quadrature filter phase shift networks will now become apparent to those skilled in the art, and are all within the scope of the present invention.

Implementations of Sin/Cos Multiplications

The phase shifters 14 of FIG. 1 are controlled by the signal $\Phi$, while the phase shift networks of FIGS. 2–7 are controlled by two signals $\cos\Phi$ and $\sin\Phi$.

Figure 10:
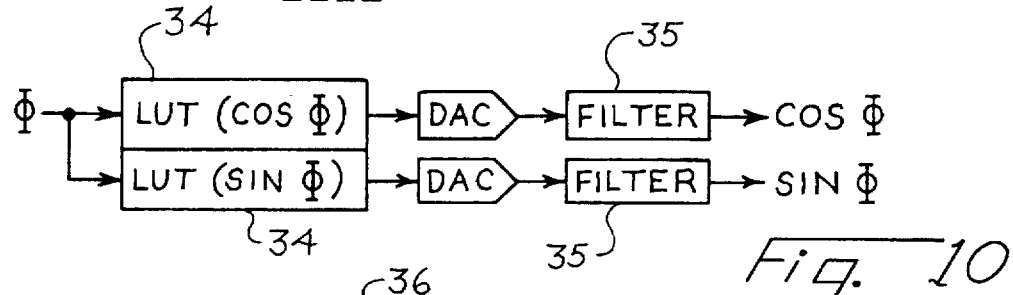
FIG. 10 is a block diagram of a circuit utilizing lookup tables for generating $\cos\Phi$ and $\sin\Phi$ analog signals.

There are numerous, well documented ways of generating $\cos\Phi$ and $\sin\Phi$ from $\Phi$. For example, as shown in FIG. 10 a digitally generated $\Phi$ can be used to index sin and cos look up tables (LUT's) 34 to generate digital signals equal to $\sin\Phi$ and $\cos\Phi$. As is well known, filters 35 can optionally be used to smooth the DAC output. Similar filters, though not shown, can be used in the embodiments discussed below following any DAC.

Figure 11:
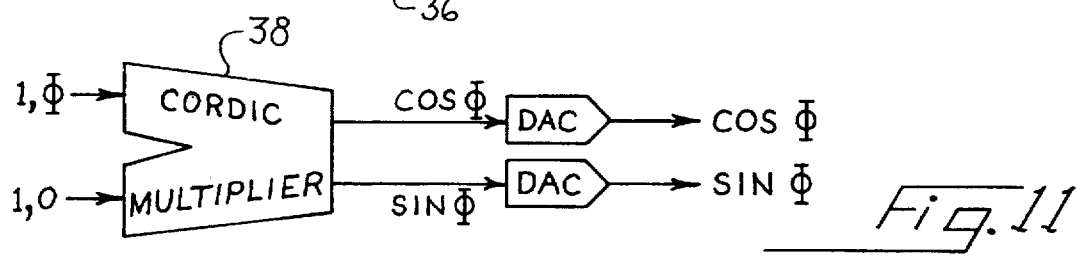
FIG. 11 is a block diagram of a circuit using a CORDIC multiplier to generate $\cos\Phi$ and $\sin\Phi$ signals.

Another approach is shown FIG. 11, where the signal Φ is applied as a polar input to a CORDIC multiplier 38, which provides digital output signals sinΦ and cosΦ. These digital signals are applied to DAC's and optional filters (not shown) to create the desired analog signals sinΦ and cosΦ.

Figure 12:
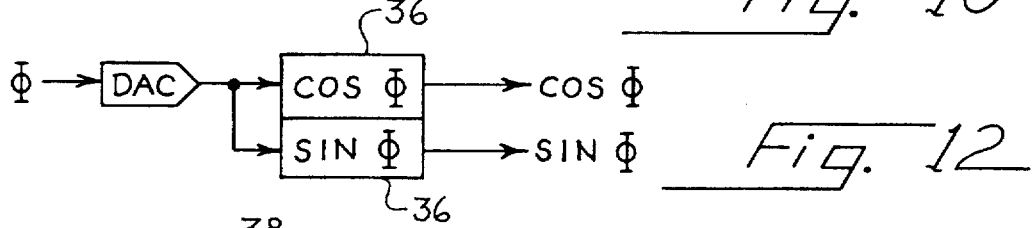
FIG. 12 is a block diagram of a circuit using $\cos\Phi$ and $\sin\Phi$ analog function generators.

FIG. 12 shows an alternative approach, in which the digitally generated signal Φ is converted to analog form with a DAC and then applied to analog function generators 36 which generate the desired analog signals sinΦ and cosΦ. These analog function generators may be, for example, of the type shown in Gilbert, U.S. Pat. No. 4,476,538.

An alternative method is to use analog techniques to perform cosΦ and sinΦ control signal multiplication. Elegant circuit solutions exist, such as the one shown in FIG. 13. As noted, 'the differential output is the input scaled by a constant (k<1) and sinΦ. Under ideal conditions, with the proper selection of the constant A (transistor emitter area), this approach can achieve astonishingly good theoretical errors, less than 0.01% over +/−90°.

The actual performance of any such circuit, considering mis-matches and imperfect temperature compensation, would be much worse. Because of the limited phase range, the present application is tolerant of much higher errors, in the range of a few percent.

Figure 13:
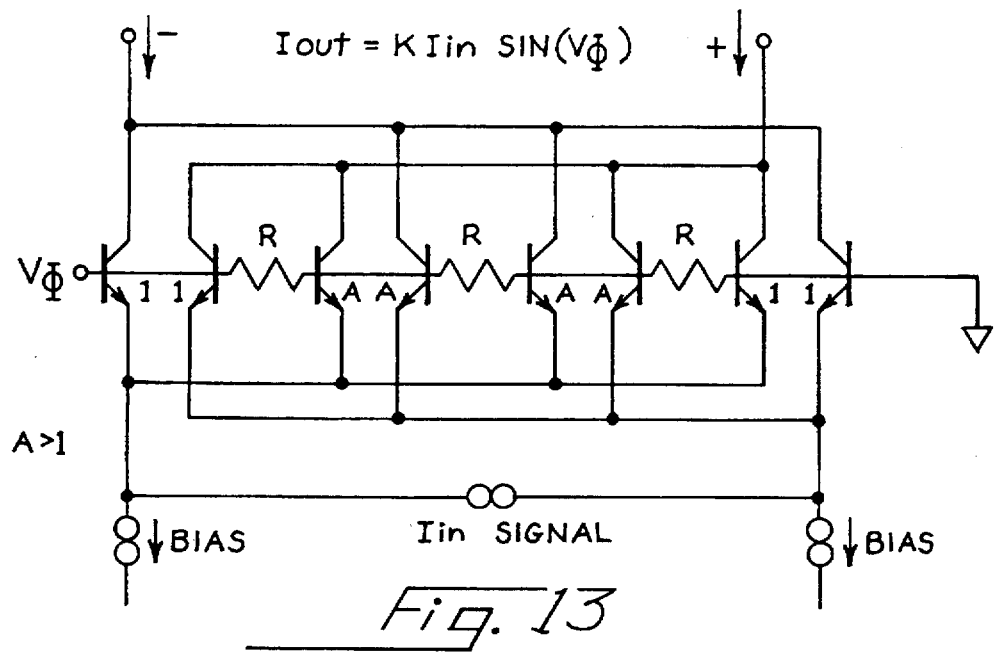
FIG. 13 is a schematic diagram of a direct multiplication circuit for multiplying a first input signal by the sine of a second input signal.

The circuit of FIG. 13 performs the desired sinΦ multiplication directly from the $V_{\phi}$, input, without ever generating an electrical parameter (voltage or current) proportional to sinΦ. This implementation requires the least hardware, but it may be desirable to implement the sinΦ multiplier by first generating sinΦ, and then using sinΦ as an input to a traditional analog multiplier, as shown in FIG. 12. Such an alternative may be desirable due to signal path integrity considerations such as noise, bandwidth, or phase shifts. The concern about phase shift is that the quadrature filter phase shift network assumes that the sinΦ multiplication causes either zero phase shift, or a phase shift that is the same as the cosΦ multiplication and is the same phase shift for all settings of Φ. To the degree that the phase shift of the multiplication varies, the phase shift accuracy of the whole quadrature filter phase shift network is degraded.

The circuit shown in FIG. 13 can be implemented with transistors of all the same size using either of the two alternative base drive schemes discussed in "A Monolithic Microsystem for the Analog Synthesis of Trigonometric Functions and Their Inverses" by Barrie Gilbert, IEEE Journal of Solid State Circuits, Vol. SC-17, #6, December 1982. The references cited in this article disclose alternative means for generating analog cos and sin functions, any of which could be applied to the quadrature filter phase shift network by those skilled in the art.

Figure 14:
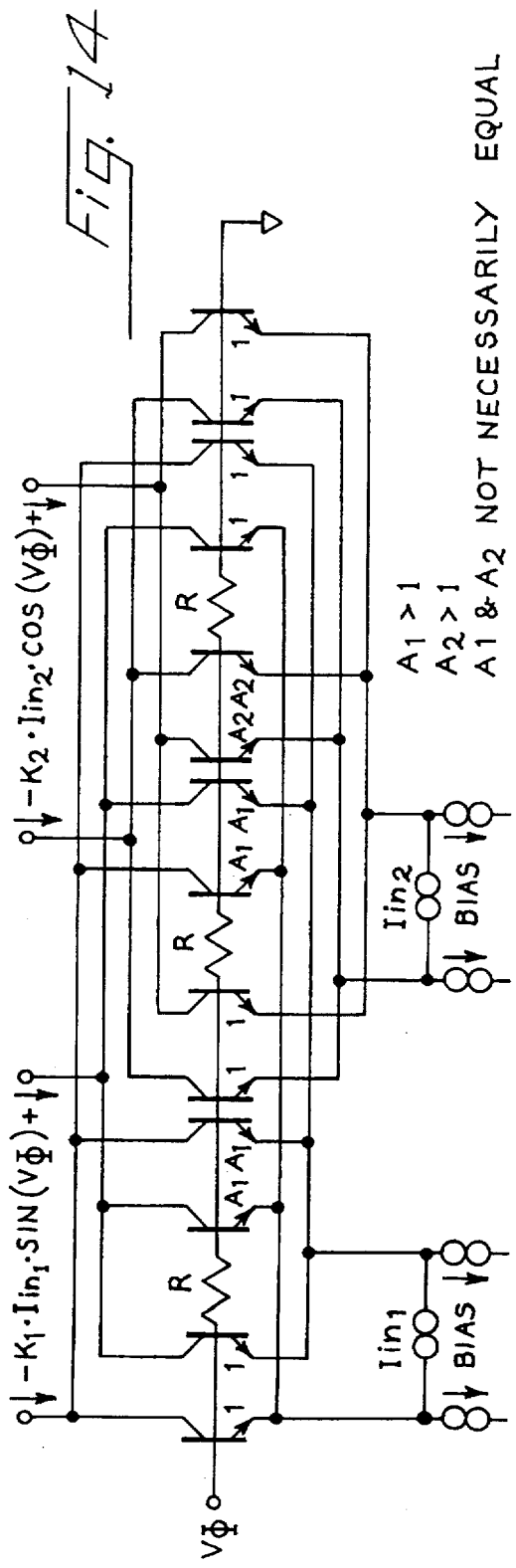
FIG. 14 is a schematic diagram of a direct multiplication circuit for multiplying a first input signal by the sine of a control signal to provide a first output and for multiplying a second input signal by the cosine of the control signal to provide a second output.
Figure 15:
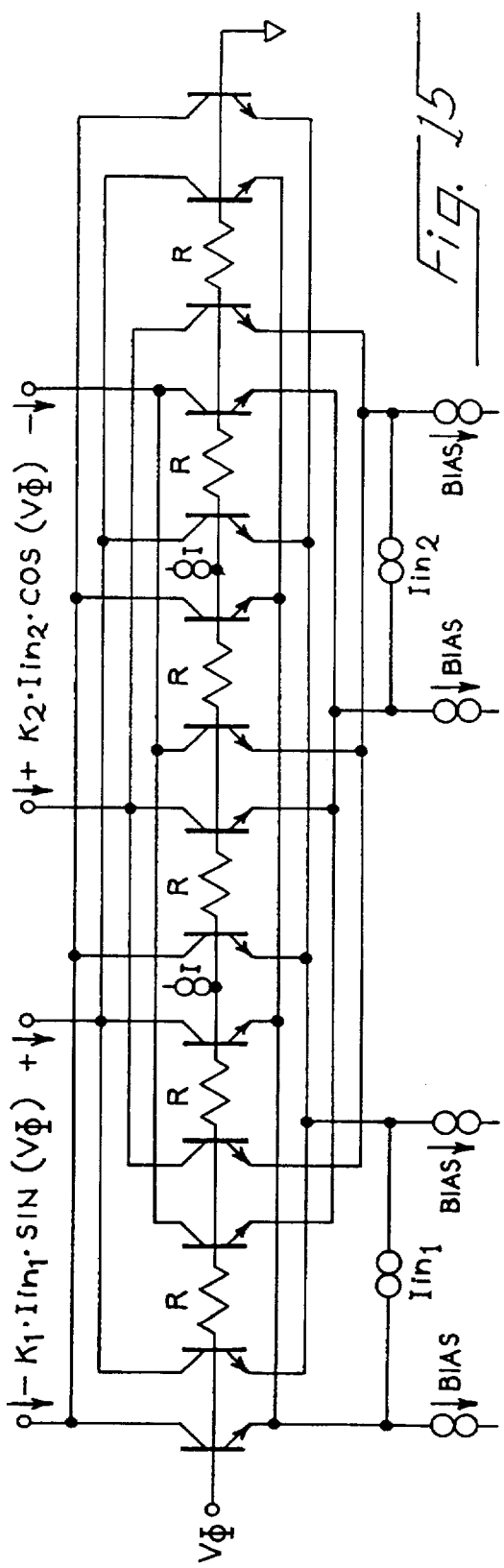
FIG. 15 is a schematic diagram of another direct sin/cos multiplication circuit.
Figure 16:
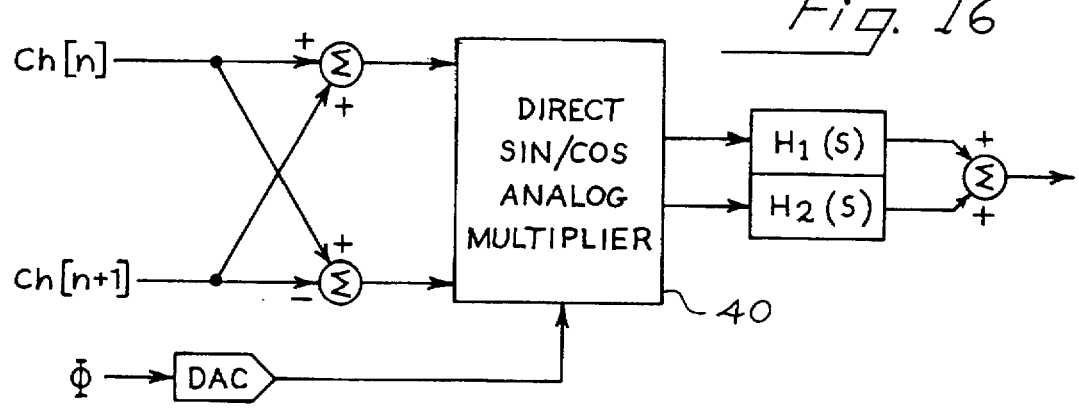
FIG. 16 is a block diagram of another phase shifter suitable for use in the embodiment of FIG. 1.

As for implementation of the cosΦ multiplication, a unified approach can be taken as shown in FIG. 14. As with FIG. 13, the implementation of FIG. 14 uses transistors of different sizes, which may not be desirable for use in the signal path. A skilled practitioner can find many such combined cos/sin solutions to the problem. FIG. 15 shows a circuit using all identically sized transistors, which performs both cosΦ and sinΦ multiplication as does the implementation of FIG. 14. The base drive scheme of FIG. 15 is similar to that used by Gilbert, but uses current sources only at alternating resistor taps. FIG. 16 shows a block diagram which is similar to FIG. 7, but which uses a direct sin/cos analog multiplier 40, (which may be identical to the circuits of FIG. 14 or FIG. 15) to make the required sinΦ and cosΦ multiplications directly from the input signal $V_{\phi}$.

In any combined analog cosΦ/sinΦ direct multiplication, the best accuracy may result with a slightly different scaling constant for the two signals. This is easily dealt with in analog by inserting a constant gain/attenuation before or after the network, and such a variation is within the scope of this invention.

Heterodyne Implementations of Phase Shifters

The phase shifters 14 of FIG. 1 can also be implemented using heterodyning techniques, in which a signal is combined with a mixing signal. The resulting signal is generally frequency translated (the exception being when the mixing frequency is twice the signal frequency), and the phase is shifted according to the phase of the mixing signal. Four possible heterodyne implementations of the phase shifter 14 are shown in FIGS. 17–20. In all four implementations, the mixing operation creates multiple outputs in the frequency domain. In the case of sine-wave multiplication there are only two, but for square-wave multiplication, generally preferred for practical reasons, there are an infinite number, through with diminishing energy. The multiple frequencies generated by the mixing and the sampling action of an ADC all contribute to the discrete time spectrum of the ADC output and should be considered for practical implementations. Judicious choices of frequencies should be made, and can include making the mixing signal frequency a submultiple of the ADC sample frequency, for instance.

Figure 17:
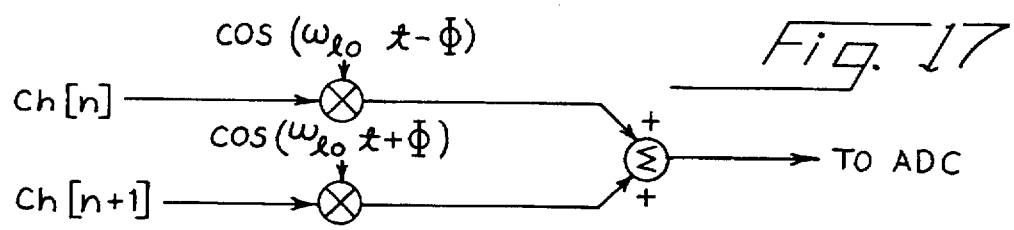
FIGS. 17–20 are block diagrams of four different heterodyning phase shifters suitable for use in the embodiment of FIG. 1.

In the implementation of FIG. 17, each channel is mixed with its own mixing signal cos $(\omega_{LO}t-\Phi)$, $\cos(\omega_{LO}t+\Phi)$, which has been properly phased by control circuitry (not shown). Because of the fine resolution needed for good phase accuracy, very small time delay differences between the possible mixing signal phases are generally needed. This approach may therefore increase costs, counter to the goal of reduced hardware cost and complexity.

The second implementation (FIG. 18) distributes a common mixing signal to all sub-arrays, and the focus control signal sent to each channel is the single analog signal Φ, as in FIG. 1. The mixing signal is passed through a quadrature filter pair 42, multiplied by cos/sin, and summed as shown. This results in a mixing signal for each channel that has been differentially shifted by Φ, with the same result as in FIG. 17.

Figure 18:
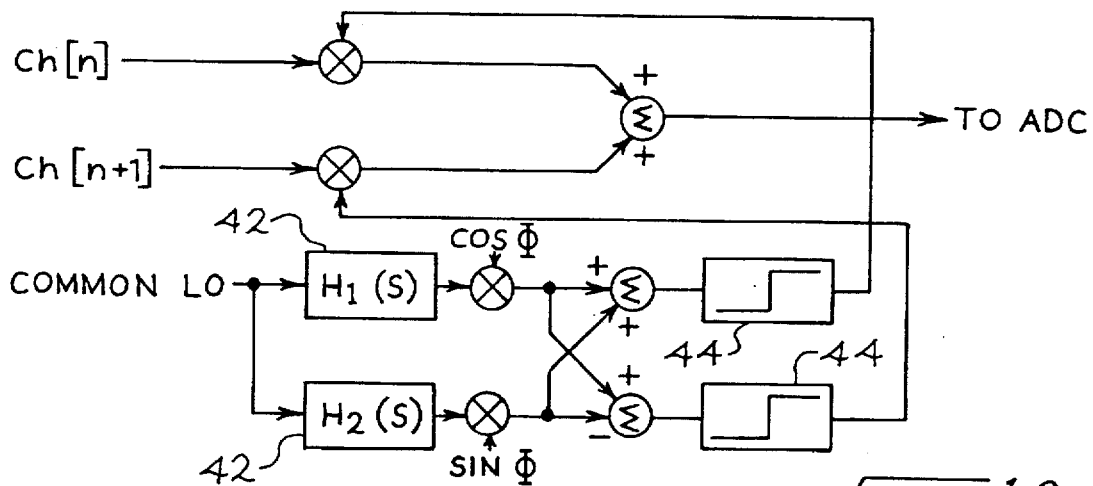

As shown in FIG. 18, the mixing signals are applied to limiters 44 before driving the mixers. This brings up the issue of sine- vs square-wave mixing signals. If the common mixing signal is a sine-wave, the apparatus of FIG. 18 will function properly with no special considerations. However, for good noise immunity, the common mixing signal in practical implementations is often a square-wave. In this case, only the fundamental is properly shifted by the quadrature filter phase shifter, and the resulting control (actual differential focusing vs. applied Φ) will be distorted. There are numerous ways of alleviating this problem, such as by converting the mixing signal to a triangle-wave before the pair of filters and using low-pass instead of all-pass networks.

A theoretically interesting way to do this is to convert the mixing signal to a triangle-wave and to use wide-band, linear-phase, all-pass filters, which create two triangle-waves at the output of the filters with 90° separation. In this case, linear interpolation of the triangle waves at the filter based on Φ, rather than cos/sin interpolations as shown in FIG. 18, can be used. Another approach is to pre-distort the Φ control signals.

Figure 19:
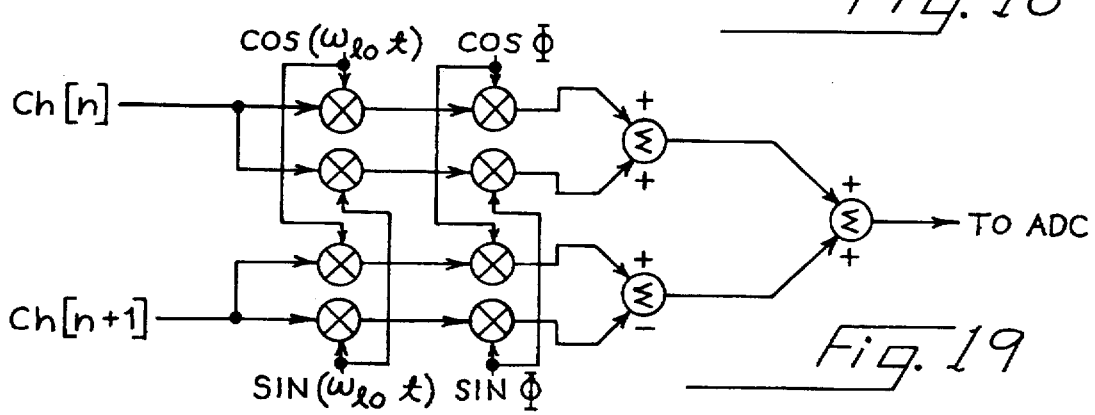

A third implementation of heterodyning for phase shifting uses a quadrature mixing scheme, as shown in FIG. 19. Here the heterodyning circuit comprises a vector modulator that splits the signal into two signals separated by 90°. These two signals are then scaled by cosΦ and sinΦ, much as in FIG.

4, except that the 90° separation is performed using heterodyning instead of the filters of FIG. 4.

The implementation of FIG. 19 is the most similar to the quadrature filter phase shifter networks of FIGS. 2–6, and the order of the blocks can be similarly interchanged. Since mixers are economical to implement, the cos/sin scalings will often be the most expensive apparatus, and the preferred arrangement will be the one which minimizes the number of such scalings. One such arrangement is shown in FIG. 20.

Figure 20:
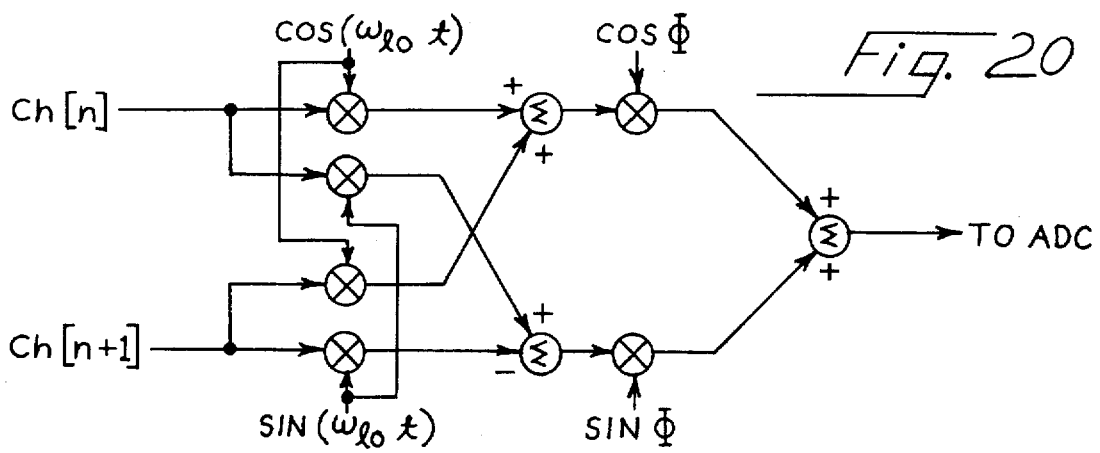

The heterodyning implementations of FIGS. 17–20 use high frequency mixing signals which are not used by the quadrature filter phase shifter networks of FIGS. 2–7. High frequency mixing signals can be difficult to route economically with sufficient isolation from the signal paths. In FIGS. 19 and 20, 90° separation must be maintained throughout the system for good phase shift accuracy. All these considerations make the heterodyning methods of FIGS. 17–20 less preferred for many applications.

Larger Sub-Arrays

Figure 21:
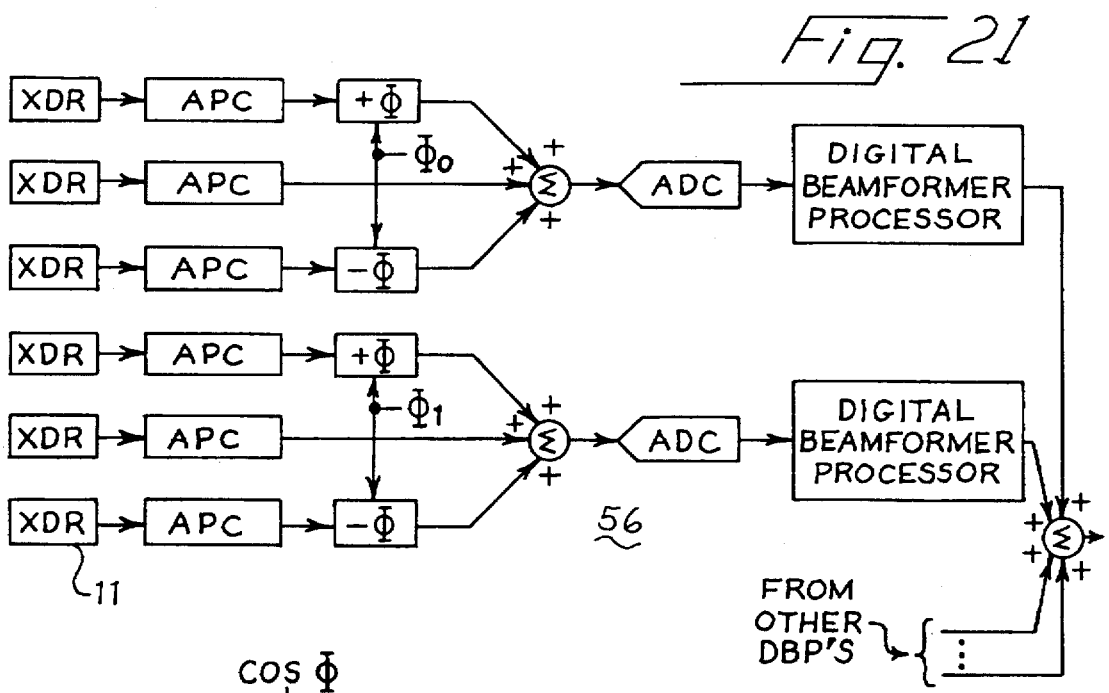
FIG. 21 is a block diagram of a second preferred embodiment of this invention in which each sub-array includes three channels.

As mentioned above, this invention can readily be implemented in systems having more than two channels per sub-array. FIG. 21 shows one embodiment of a beamformer 56 having three transducers 11 per sub-array.

Differential phasing is very nearly linear across sub-arrays of three adjacent channels, and for this reason the same $\Phi$ can be used for the two outer channels, in opposite polarity, and no phase shifting of the center channel is required. It should be noted that the $\Phi$ used with three-channel sub-arrays will generally be 100% larger than that needed for two-channel sub-arrays. Some performance degradation for the system of FIG. 21 can be expected from the lack of real delay compensation in the sub-array, resulting in increased grating lobes and loss of resolution in range.

Figure 22:
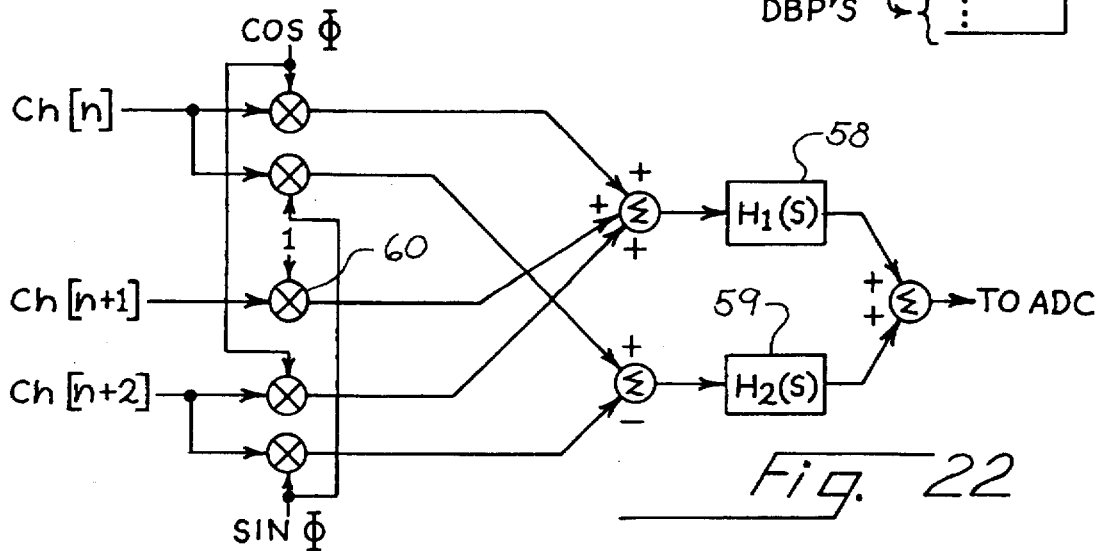
FIGS. 22–24 are block diagrams of two different phase shifters suitable for use in the embodiment of FIG. 21.
Figure 23:
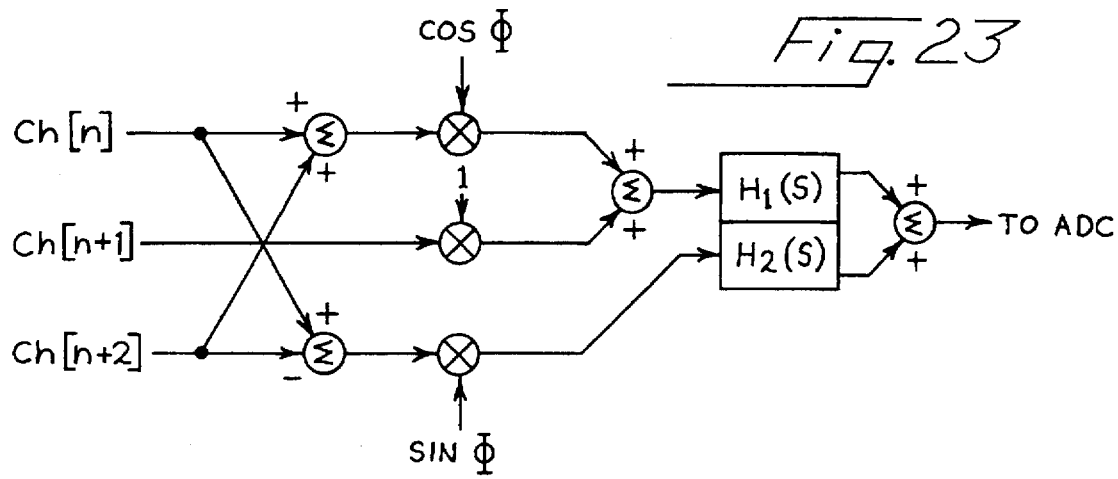
Figure 24:
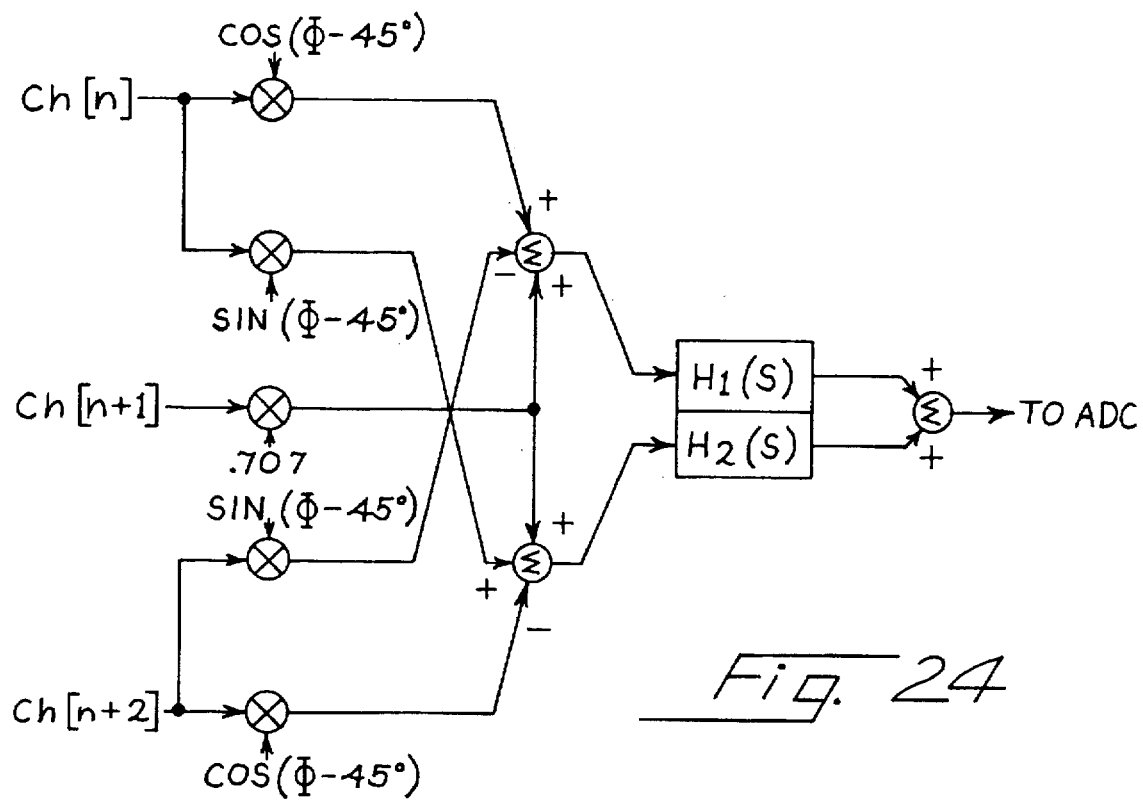

One implementation of a quadrature filter phase shifter for the three-channel sub-array is shown in FIG. 22. Note that the center channel is filtered by the $H_1(S)$ filter 58, in order to keep the delay and dispersion common for all channels. If the cos/sin multipliers add significant phase shift, the multiplier 60 should be such as to reproduce that phase shift for the center channel. Otherwise the center multiplier 60 can be omitted to reduce hardware. FIG. 23 shows another implementation, similar to that of FIG. 22, which re-arranges the processing order to reduce the component count further. FIGS. 22 and 23 show the preferred implementations in which there is only one set of filters 58,59 per sub-array, but implementations are also possible in which the processing order is rearranged as discussed above. For instance, a nominal phase shift of 45° is added to the entire sub-array of a three channel network in the implementation of FIG. 24.

Figure 25:
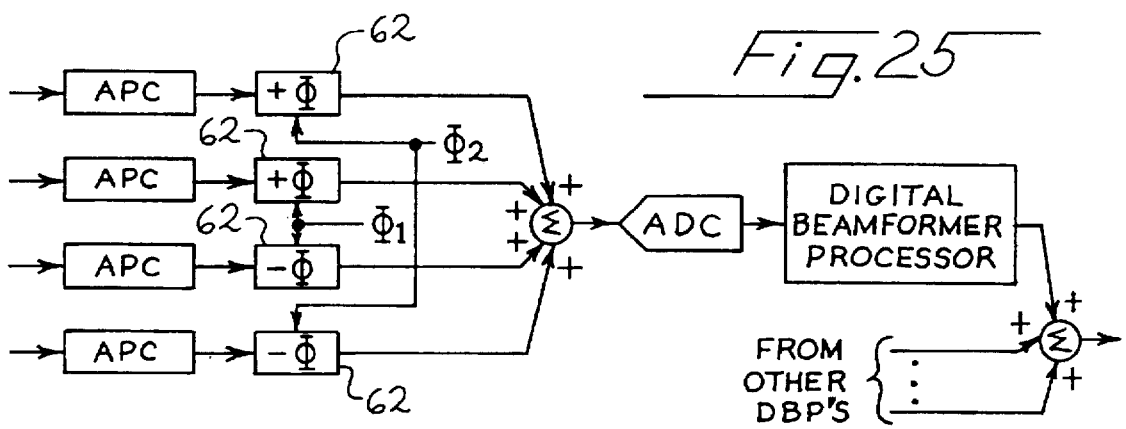
FIG. 25 is a block diagram of a third preferred embodiment in which each sub-array includes four channels.
Figure 26:
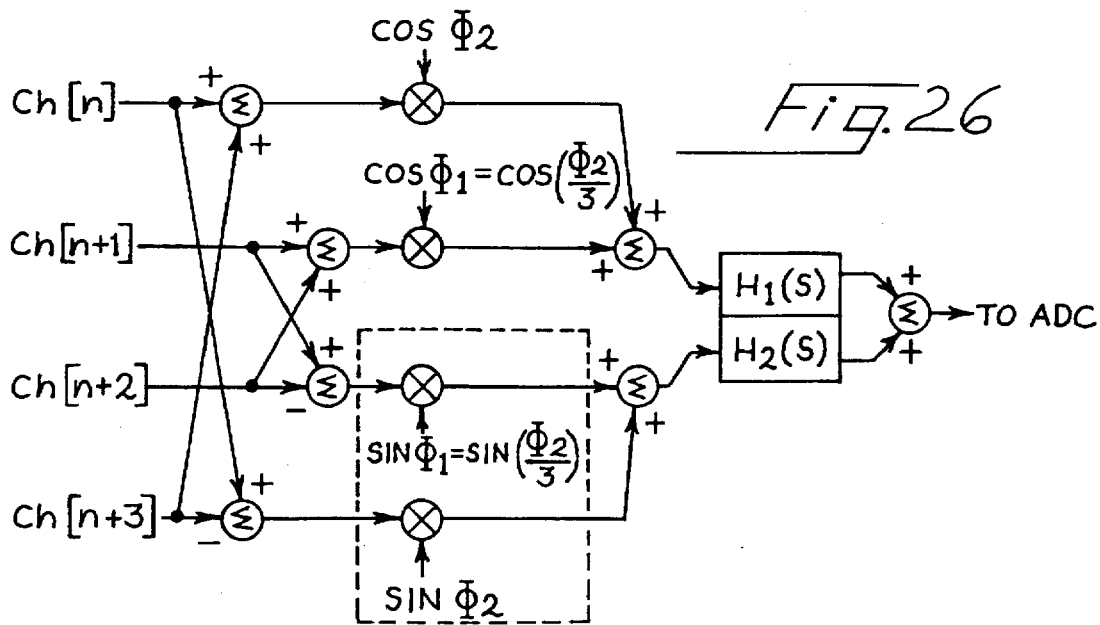
FIG. 26 is a block diagram of a phase shifter suitable for use in the embodiment of FIG. 25.

FIG. 25 shows a suitable architecture for four channel sub-arrays. Substantial performance degradation may result due to the increased grating lobes and the loss of range resolution, but the ADC/DBP cost has been cut to one-quarter that of the digital beamformer of FIG. 29. FIG. 26 shows a suitable phase shifter for a four channel sub-array processor. This phase shifter minimizes the component count.

Figure 27:
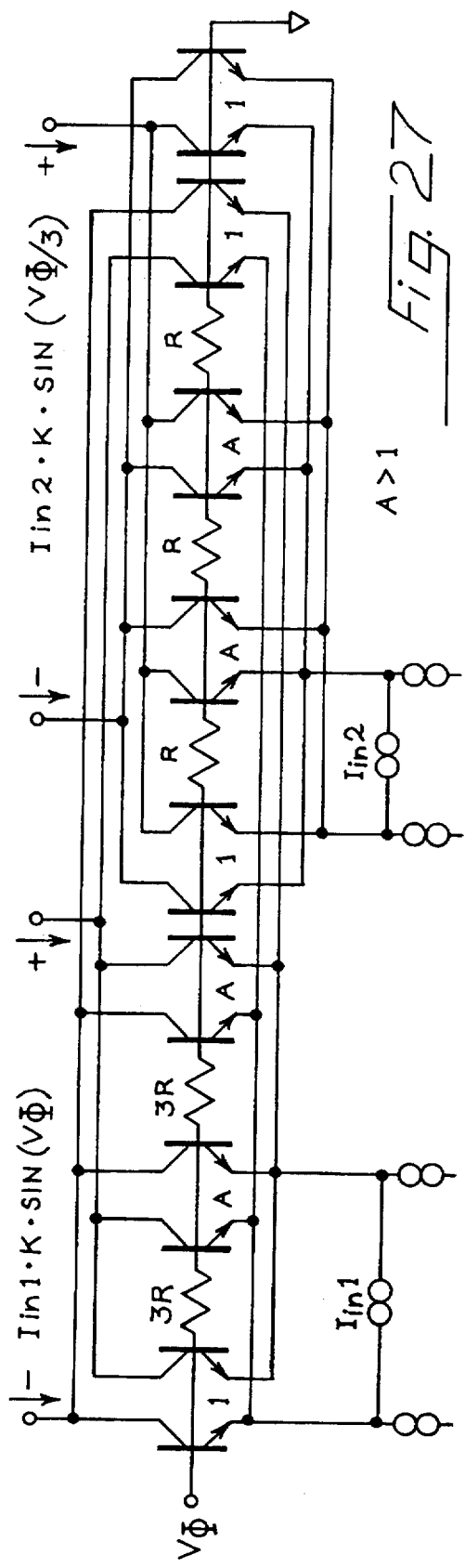
FIG. 27 is a schematic diagram of a direct sin/cos multiplier suitable for use with the embodiment of FIG. 25.

The phase shifters 62 of FIG. 25 utilize two phase inputs, $\Phi_1$ and $\Phi_2$. This does not double the complexity of the sub-array focus control however, because there is little performance degradation when the following approximation is made: $\Phi_2 = 3*\Phi_1$. For analog implementations of the cos/sin weighting, this relationship can be implemented using resistor dividers, so only a single control input is needed for each sub-array. This arrangement is shown in FIG. 27, an extension of the circuit of FIG. 14.

Multi-Row Transducer Arrays

The phased sub-array receive beamformer architecture discussed above has applications to multi-row transducer arrays having a large number of channels in each row (64–128), but a smaller number of channels in each column.

Elevation Plane Focusing

Figure 28:
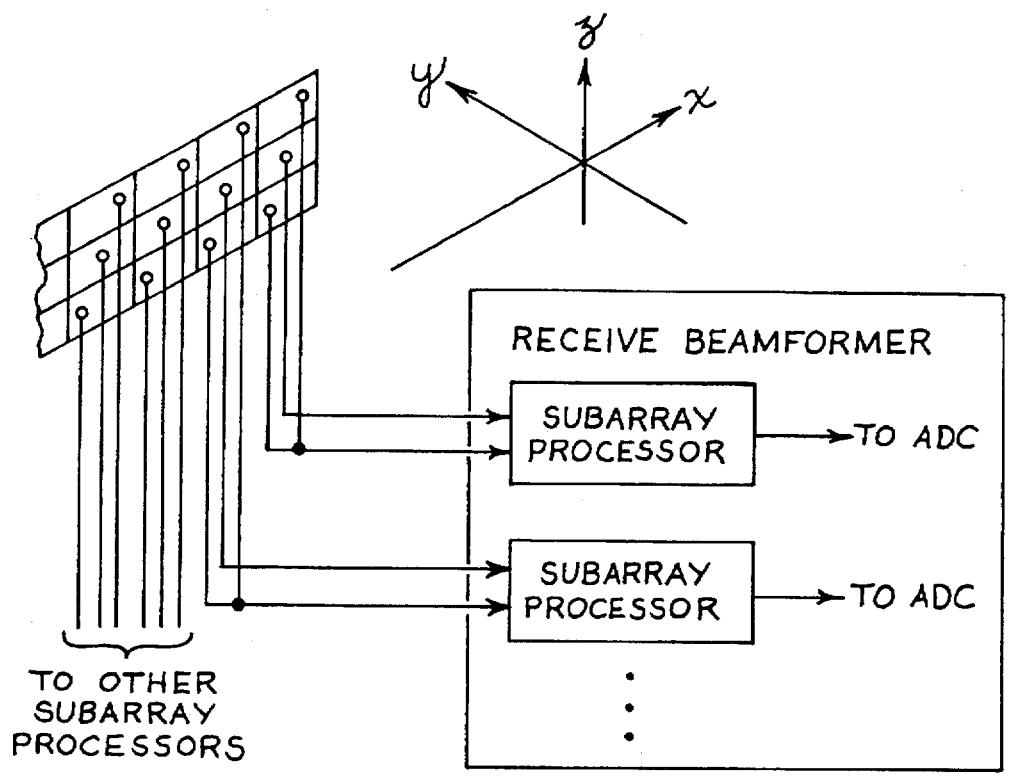
FIG. 28 is a block diagram of a receive beamformer responsive to a 1.5 D transducer array.

When such arrays are used only to focus (but not scan) in a third dimension, they are conventionally referred to as 1.5-D arrays. If, for instance, the elements of a row of transducers are slit into three columns, the elevation slice thickness can be reduced by phasing the inner elements of the column separately from the outer elements of the column. If the outer pair of elements is wired together, a beamformer such as that of FIG. 1 having two channels per sub-array can be used by connecting all the inner elements to the even-numbered channels and all the outer elements to the odd-numbered channels. FIG. 28 shows such an arrangement. The elevation focus is then controlled by the sub-array processors. In this case the sub-array processors can all be driven with the same $\Phi$, which approaches zero with increasing range. Because of the propagation delays, the different columns are actually focusing at different ranges at any instant, so the $\Phi$'s can also be timed differently for each sub-array. With either of these approaches, the $\Phi$'s of adjacent sub-arrays are still well correlated (and independent of the DBP delay), allowing the simplification of linearly interpolated $\Phi$'s mentioned earlier.

Elevation Plane Steering

Another application for two-dimensional arrays provides three-dimensional imaging by scanning the elevation plane. If the number of transducers per column is the same as the sub-array element size, it is a simple matter to do this scanning with the sub-array processors described above. The successive elements of each column can be connected to the respective elements of a sub-array, and the $\Phi$'s, when all identically driven, become an elevation steering control. This method allows no focusing in the elevation direction, and it is not likely to be the best 3-D imaging method; however, this approach is an economical way to add 3-D capability to a 2-D imaging system.

Conclusion

From the foregoing, it should be apparent that improved ultrasound receive beamformers have been described having substantially reduced complexity, while retaining important features of modern digital receive beamformers such as the ability to form multiple, time-interleaved receive beams, the ability to perform adaptive focusing, and the ability to calibrate amplitude, phase, or both.

It is intended that the foregoing detailed description be regarded as an illustration and not as a definition of the invention. Those skilled in the art will recognize that many changes and modifications can be made to the preferred embodiments discussed above, as necessary to implement this invention for specific applications. It is only the following claims, including all equivalents, which are intended to define the scope of this invention.

We claim:

1. In an ultrasonic receive beamformer of the type comprising a plurality of digital beamformer processors and a plurality of transducers, each transducer forming a respective receive signal, the improvement comprising:

a plurality of analogy sub-array processors, each sub-array processor comprising at least one phase adjusting element and a summer, each phase adjusting element responsive to at least one of the receive signals to shift the receive signal by a respective phase angle and to apply the shifted receive signals to the summer, each of the summers supplying a summed sub-array signal to a respective one of the beamformer processors, wherein the phase angles for any one of the sub-array processors form a sum substantially equal to zero.

2. In an ultrasonic receive beamformer of the type comprising a plurality of digital beamformer processors and a plurality of transducers, each transducer forming a respective receive signal, the improvement comprising:

a plurality of sub-array processors, each sub-array processor comprising at least one phase adjusting element and a summer, each phase adjusting element responsive to at least one of the receive signals to shift the receive signal by a respective phase angle and to apply the shifted receive signals to the summer, each of the summers supplying a summed sub-array signal to a respective one of the beamformer processors, wherein each digital beamformer processor delays the respective sub-array signal by a respective time delay, and wherein the phase angles for any one of the sub-array processors are independent of the time delay of the respective digital beamformer processor.

3. In an ultrasonic receive beamformer of the type comprising a plurality of digital beamformer processors and a plurality of transducers, each transducer forming a respective receive signal, the improvement comprising:

a plurality of sub-array processors, each sub-array processor comprising at least one phase adjusting element and a summer, each phase adjusting element responsive to at least one of the receive signals to shift the receive signal by a respective phase angle and to apply the shifted receive signals to the summer, each of the summers supplying a summed sub-array signal to a respective one of the beamformer processors, wherein each digital beamformer processor delays the respective sub-array signal by a respective time delay, and wherein time resolution of the time delays is substantially as fine as time resolution of the phase angles.

4. In an ultrasonic receive beamformer of the type comprising a plurality of digital beamformer processors and a plurality of transducers, each transducer forming a respective receive signal, the improvement comprising:

a plurality of sub-array processors, each sub-array processor comprising at least one phase adjusting element and a summer, each phase adjusting element responsive to at least one of the receive signals to shift the receive signal by a respective phase angle and to apply the shifted receive signals to the summer, each of the summers supplying a summed sub-array signal to a respective one of the beamformer processors, wherein the digital beamformer processors are characterized by a focusing update rate; and wherein the phase angles of the phase adjusting elements are updated at a slower rate than the focusing update rate.

5. The invention of claim 1 or 2 or 3 or 4 wherein the phase adjusting elements each comprise a respective pair of quadrature filters.

6. The invention of claim 5 wherein each quadrature filter phase adjusting element comprises only two filters.

7. The invention of claim 1 or 2 or 3 or 4 wherein the phase adjusting elements within each sub-array comprise means for applying a differential phase shift to a respective pair of receive signals of the sub-array.

8. The invention of claim 1 or 2 or 3 of 4 wherein the phase adjusting elements comprise respective heterodyning circuits.

9. The invention of claim 8 wherein the receive beamformer further comprises a plurality of quadrature phase adjusting elements, each responsive to a common mixing signal to phase shift the common mixing signal and to supply the phase-shifted common mixing signal to the respective heterodyning circuit.

10. The invention of claim 1 or 2 or 3 or 4 wherein each phase adjusting element comprises a multiplier responsive to a phase control signal, and wherein the receive beamformer further comprises at least one look up table for generating the phase control signals.

11. The invention of claim 1 or 2 or 3 or 4 wherein each phase adjusting element comprises a multiplier responsive to a phase control signal, and wherein the receive beamformer further comprises at least one CORDIC multiplier for generating the phase control signals.

12. The invention of claim 1 or 2 or 3 or 4 wherein each phase adjusting element comprises a multiplier responsive to a phase control signal, and wherein the receive beamformer further comprises at least one analog function generator for generating the phase control signals.

13. The invention of claim 1 or 2 or 3 or 4 wherein the phase adjusting element of each sub-array processor comprises at least one direct multiplier operative to multiply a first input signal by at least one trigonometric function of a second input signal, wherein the trigonometric function comprises a function selected from the group consisting of sine and cosine.

14. The invention of claim 13 wherein the direct multiplier is operative to multiply the first input by a sine function of the second input signal to form a first output signal and to multiply a third input signal by a cosine function of the second input signal to form a second output signal.

15. The invention of claim 1 or 2 or 3 or 4 wherein the phase adjusting elements of each sub-array processor comprise at least two summers and at least two multipliers, each summer operative to sum two signals responsive to respective receive signals to generate a respective first output signal, each multiplier operative to multiply a respective first output signal by a respective phase control signal to generate a respective second output signal.

16. The invention of claim 15 further comprising two quadrature filters, each responsive to a respective second output signal.

17. The invention of claim 15 wherein a first one of the summers sums the two signals responsive to respective receive signals with a single selected polarity to form an additive sum, and wherein a second one of the summers sums the two signals responsive to respective receive signals with opposed polarities to form a differential sum.

18. The invention of claim 1 or 2 or 3 or 4 wherein the digital beamformer processors are operative to form multiple, time-interleaved receive beams from the summed sub-array signals.

19. The invention of claim 1 or 2 or 3 or 4 wherein the digital beamformer processors are operative to perform adaptive focusing on the summed sub-array signals.

20. The invention of claim 1 or 2 or 3 or 4 wherein the digital beamformer processors are operative apply at least one of amplitude and phase calibration to the summed sub-array signals.

21. The invention of claims 1 or 2 or 3 or 4 wherein the transducers comprise at least one row of transducers, and wherein each sub-array processor is responsive to a respective plurality of receive signals formed by a respective plurality of adjacent transducers in said row.

22. The invention of claims 1 or 2 or 3 or 4 wherein the transducers comprise at least one row and at least one column of transducers, and wherein each sub-array processor is responsive to a respective plurality of receive signals formed by a respective plurality of transducers in a respective column.

* * * * *